United States Patent
Nam et al.

(10) Patent No.: US 11,848,733 B2
(45) Date of Patent: Dec. 19, 2023

(54) PRIORITY LEVELS FOR CHANNEL STATE INFORMATION REPORTING

(71) Applicant: QUALCOMM Incorporated, San Diego, CA (US)

(72) Inventors: Wooseok Nam, San Diego, CA (US); Yan Zhou, San Diego, CA (US); Tao Luo, San Diego, CA (US); Peter Gaal, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 17/223,943

(22) Filed: Apr. 6, 2021

(65) Prior Publication Data

US 2021/0320700 A1    Oct. 14, 2021

Related U.S. Application Data

(60) Provisional application No. 63/006,897, filed on Apr. 8, 2020.

(51) Int. Cl.
*H04B 7/06* (2006.01)
*H04W 76/28* (2018.01)
*H04W 52/02* (2009.01)

(52) U.S. Cl.
CPC ...... *H04B 7/0626* (2013.01); *H04W 52/0235* (2013.01); *H04W 76/28* (2018.02)

(58) Field of Classification Search
CPC .................. H04B 7/0626; H04W 52/0235; H04W 76/28; H04W 24/10; Y02D 30/70
See application file for complete search history.

(56) References Cited

U.S. PATENT DOCUMENTS

| 9,591,492 | B2 * | 3/2017 | Yoo ........................ H04W 24/00 |
| 2013/0114455 | A1 * | 5/2013 | Yoo ........................ H04L 1/0027 |
| | | | 370/252 |

(Continued)

FOREIGN PATENT DOCUMENTS

| WO | WO-2014047909 A1 * | 4/2014 | ........... H04B 7/0626 |
| WO | WO-2021159464 A1 * | 8/2021 | |

OTHER PUBLICATIONS

Xia, "Aperiodic CSI Feedback Processing Method and Device", Apr. 3, 2014, WO, English translation of WO 2014047909. (Year: 2014).*

(Continued)

*Primary Examiner* — Michael K Phillips
(74) *Attorney, Agent, or Firm* — Holland & Hart LLP

(57) ABSTRACT

Methods, systems, and devices for wireless communications are described to provide for a user equipment (UE) and a base station to dynamically change a priority level of channel state information (CSI) reporting, such as from a low level to a high priority level, and in some cases back to the low level. If a condition is met, the UE and the base station may determine to change the priority of the CSI reporting from a low priority level to a high priority level. When the priority level for the CSI reporting is changed to a high priority level, the UE may transmit one or more CSI reports to the base station. The UE and the base station may change the priority level of the CSI reporting back to a low priority level if a second condition is met.

30 Claims, 16 Drawing Sheets

(56) References Cited

U.S. PATENT DOCUMENTS

| | | | |
|---|---|---|---|
| 2014/0036854 A1* | 2/2014 | Tong | H04L 25/0224 370/329 |
| 2014/0105049 A1* | 4/2014 | Kim | H04L 5/0057 370/252 |
| 2015/0208404 A1* | 7/2015 | Yie | H04L 1/1861 370/329 |
| 2017/0366998 A1* | 12/2017 | Lee | H04L 25/0204 |
| 2019/0159219 A1* | 5/2019 | Hosseini | H04B 7/0628 |
| 2019/0215897 A1* | 7/2019 | Babaei | H04W 76/38 |
| 2020/0343955 A1* | 10/2020 | Park | H04B 7/0695 |
| 2021/0307078 A1* | 9/2021 | Singh | H04W 74/0833 |
| 2021/0360610 A1* | 11/2021 | Kim | H04W 72/042 |
| 2022/0183079 A1* | 6/2022 | Ouchi | H04W 74/0841 |
| 2023/0097142 A1* | 3/2023 | Alfarhan | H04L 5/0051 370/329 |
| 2023/0107546 A1* | 4/2023 | Basu | H04L 5/0057 370/252 |

OTHER PUBLICATIONS

Yang, "Method and Device for Sending and Receiving Information", Aug. 19, 2021, WO, English translation of WO 2021159464. (Year: 2021).*

* cited by examiner

PRIORITY LEVELS FOR CHANNEL STATE INFORMATION REPORTING

CROSS REFERENCE

The present application for patent claims the benefit of U.S. Provisional Patent Application No. 63/006,897 by NAM et al., entitled "PRIORITY LEVELS FOR CHANNEL STATE INFORMATION REPORTING," filed Apr. 8, 2020, assigned to the assignee hereof, and expressly incorporated by reference herein.

TECHNICAL FIELD

The following relates generally to wireless communications and more specifically to priority levels for channel state information (CSI) reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may pass a period of time without transmitting a channel state information (CSI) report. If the UE does not measure and report CSI information, a quality or a reliability of communications may be reduced, and in some cases, beam failure or link failure may occur.

SUMMARY

The described techniques relate to improved methods, systems, devices, and apparatuses that support dynamic priority levels for channel state information (CSI) reporting. Generally, the described techniques provide for a UE and a base station to independently and concurrently (or nearly concurrently) determine to override a low priority level for CSI reporting by changing the priority level of the CSI reporting to a high priority level. If a condition is met, the UE and the base station may determine to change the priority of the CSI reporting from a low priority level (e.g., a first priority level) to a high priority level (e.g., a second priority level). For example, the UE and the base station may change the priority level of the CSI reporting to a high priority level if the CSI reporting occurs during a discontinuous reception (DRX) inactive time, if the UE meets a threshold time duration outside of DRX active time, or if a threshold time duration is satisfied in which the UE does not report CSI, among other examples. The UE and the base station may change the priority level of the CSI reporting back to a low priority level if a second condition is met. For example, the UE may transmit a predetermined number of CSI reports, a threshold time duration may pass with the CSI reporting at a high priority level, the UE may transition to a DRX active time (e.g., the base station may transmit a wake-up signal (WUS) to the UE), or the base station may explicitly signal the UE to transition to low priority for CSI reporting, among other examples.

The base station and/or the UE may determine to change the priority level of the CSI reporting based on the condition. When the priority level for the CSI reporting is changed to a high priority level, the UE may transmit one or more CSI reports to the base station, and the UE and the base station may change the priority level of the CSI reporting back to a low priority level if the second condition is met.

A method of wireless communication at a UE is described. The method may include determining that a condition is met for a change in a priority level of CSI reporting associated with communications between the UE and a base station, changing the priority level of the CSI reporting from a first priority level to a second priority level based on determining that the condition is met, and transmitting, to the base station, a CSI report based on the CSI reporting having the second priority level.

An apparatus for wireless communication at a UE is described. The apparatus may include at least one processor, memory coupled (e.g., operatively, communicatively, functionally, electronically, electrically) to the at least one processor, and instructions stored in the memory. The instructions may be executable by the at least one processor to cause the apparatus to determine that a condition is met for a change in a priority level of CSI reporting associated with communications between the UE and a base station, change the priority level of the CSI reporting from a first priority level to a second priority level based on determining that the condition is met, and transmit, to the base station, a CSI report based on the CSI reporting having the second priority level.

Another apparatus for wireless communication at a UE is described. The apparatus may include means for determining that a condition is met for a change in a priority level of CSI reporting associated with communications between the UE and a base station, changing the priority level of the CSI reporting from a first priority level to a second priority level based on determining that the condition is met, and transmitting, to the base station, a CSI report based on the CSI reporting having the second priority level.

A non-transitory computer-readable medium storing code for wireless communication at a UE is described. The code may include instructions executable by a processor to determine that a condition is met for a change in a priority level of CSI reporting associated with communications between the UE and a base station, change the priority level of the CSI reporting from a first priority level to a second priority level based on determining that the condition is met, and transmit, to the base station, a CSI report based on the CSI reporting having the second priority level.

In some examples of the method, apparatuses, and non-transitory computer-readable medium described herein, the second priority level may be higher than the first priority level.

In some examples of the method, apparatuses, and non-transitory computer-readable medium described herein, determining that the condition may be met may include operations, features, means, or instructions for identifying that the UE may be configured for a DRX mode that may be associated with a WUS, and determining that the CSI reporting may be configured to be performed outside of an active time for the DRX mode, where changing the priority level may be based on determining that the CSI reporting may be configured to be performed outside of the active time.

In some examples of the method, apparatuses, and non-transitory computer-readable medium described herein, determining that the condition may be met may include operations, features, means, or instructions for identifying that the UE may be configured for a DRX mode that may be associated with an active time, and determining that the UE may have operated in the DRX mode and outside of the active time for a duration that satisfies a threshold, where changing the priority level may be based on the duration satisfying the threshold.

In some examples of the method, apparatuses, and non-transitory computer-readable medium described herein, the threshold may include a threshold amount of time or a threshold number of DRX cycles, where each DRX cycle includes a respective potential active time.

In some examples of the method, apparatuses, and non-transitory computer-readable medium described herein, determining that the condition may be met may include operations, features, means, or instructions for transmitting a prior CSI report in accordance with the CSI reporting, and determining that an amount of time since transmitting the prior CSI report satisfies a threshold, where changing the priority level may be based on determining that the amount of time since transmitting the prior CSI report satisfies the threshold.

In some examples of the method, apparatuses, and non-transitory computer-readable medium described herein, the threshold may include a threshold amount of time, or a threshold number of DRX cycles, or a threshold number of missed reporting occasions for the CSI reporting.

Some examples of the method, apparatuses, and non-transitory computer-readable medium described herein may further include operations, features, means, or instructions for determining that a second condition may be met for a change in the priority level of the CSI reporting, and changing the priority level of the CSI reporting from the second priority level to the first priority level based on determining that the second condition may be met.

In some examples of the method, apparatuses, and non-transitory computer-readable medium described herein, determining that the second condition may be met may include operations, features, means, or instructions for determining, based on transmitting the CSI report, that a quantity of CSI reports transmitted in accordance with the CSI reporting satisfies a threshold quantity.

In some examples of the method, apparatuses, and non-transitory computer-readable medium described herein, determining that the second condition may be met may include operations, features, means, or instructions for determining, after changing the priority level of the CSI reporting from the first priority level to the second priority level, that a threshold amount of time may have passed or that a threshold quantity of DRX cycles may have occurred.

In some examples of the method, apparatuses, and non-transitory computer-readable medium described herein, determining that the second condition may be met may include operations, features, means, or instructions for receiving, from the base station, a WUS indicating for the UE to transition to an active state associated with the DRX mode.

In some examples of the method, apparatuses, and non-transitory computer-readable medium described herein, determining that the second condition may be met may include operations, features, means, or instructions for receiving, from the base station, signaling including an indication for the UE to change the priority level of the CSI reporting from the second priority level to the first priority level.

Some examples of the method, apparatuses, and non-transitory computer-readable medium described herein may further include operations, features, means, or instructions for receiving, from the base station, signaling including an indication of the condition for the UE to change the priority level of the CSI reporting from the first priority level to the second priority level.

Some examples of the method, apparatuses, and non-transitory computer-readable medium described herein may further include operations, features, means, or instructions for transmitting, to the base station, a capability report, where the indication of the condition may be based on the capability report.

In some examples of the method, apparatuses, and non-transitory computer-readable medium described herein, the signaling further includes an indication of a second condition for the UE to change the priority level of the CSI reporting from the second priority level to the first priority level.

In some examples of the method, apparatuses, and non-transitory computer-readable medium described herein, the CSI reporting may be periodic or semi-persistent CSI reporting.

A method of wireless communication at a base station is described. The method may include determining that a condition is met for a change in a priority level of CSI reporting associated with communications between the base station and a UE, changing the priority level of the CSI reporting from a first priority level to a second priority level based on determining that the condition is met, and receiving, from the UE, a CSI report based on the CSI reporting having the second priority level.

An apparatus for wireless communication at a base station is described. The apparatus may include at least one processor, memory coupled (e.g., operatively, communicatively, functionally, electronically, electrically) to the at least one processor, and instructions stored in the memory. The instructions may be executable by the at least one processor to cause the apparatus to determine that a condition is met for a change in a priority level of CSI reporting associated with communications between the base station and a UE, change the priority level of the CSI reporting from a first priority level to a second priority level based on determining that the condition is met, and receive, from the UE, a CSI report based on the CSI reporting having the second priority level.

Another apparatus for wireless communication at a base station is described. The apparatus may include means for determining that a condition is met for a change in a priority level of CSI reporting associated with communications between the base station and a UE, changing the priority level of the CSI reporting from a first priority level to a second priority level based on determining that the condition is met, and receiving, from the UE, a CSI report based on the CSI reporting having the second priority level.

A non-transitory computer-readable medium storing code for wireless communication at a base station is described. The code may include instructions executable by a processor to determine that a condition is met for a change in a priority level of CSI reporting associated with communications between the base station and a UE, change the priority level of the CSI reporting from a first priority level to a second priority level based on determining that the condition is met, and receive, from the UE, a CSI report based on the CSI reporting having the second priority level.

In some examples of the method, apparatuses, and non-transitory computer-readable medium described herein, the second priority level may be higher than the first priority level.

In some examples of the method, apparatuses, and non-transitory computer-readable medium described herein, determining that the condition may be met may include operations, features, means, or instructions for identifying that the UE may be configured for a DRX mode that may be associated with a WUS, and determining that the CSI reporting may be configured to be performed outside of an active time for the DRX mode, where changing the priority level may be based on determining that the CSI reporting may be configured to be performed outside of the active time.

In some examples of the method, apparatuses, and non-transitory computer-readable medium described herein, determining that the condition may be met may include operations, features, means, or instructions for identifying that the UE may be configured for a DRX mode that may be associated with an active time, and determining that the UE may have operated in the DRX mode and outside of the active time for a duration that satisfies a threshold, where changing the priority level may be based on the duration satisfying the threshold.

In some examples of the method, apparatuses, and non-transitory computer-readable medium described herein, the threshold may include a threshold amount of time or a threshold number of DRX cycles, where each DRX cycle includes a respective potential active time.

In some examples of the method, apparatuses, and non-transitory computer-readable medium described herein, determining that the condition may be met may include operations, features, means, or instructions for receiving a prior CSI report in accordance with the CSI reporting, and determining that an amount of time since receiving the prior CSI report satisfies a threshold, where changing the priority level may be based on determining that the amount of time since receiving the prior CSI report satisfies the threshold.

In some examples of the method, apparatuses, and non-transitory computer-readable medium described herein, the threshold may include a threshold amount of time, or a threshold number of DRX cycles, or a threshold number of missed reporting occasions for the CSI reporting.

Some examples of the method, apparatuses, and non-transitory computer-readable medium described herein may further include operations, features, means, or instructions for determining that a second condition may be met for a change in the priority level of the CSI reporting, and changing the priority level of the CSI reporting from the second priority level to the first priority level based on determining that the second condition may be met.

In some examples of the method, apparatuses, and non-transitory computer-readable medium described herein, determining that the second condition may be met may include operations, features, means, or instructions for determining, based on receiving the CSI report, that a quantity of CSI reports received in accordance with the CSI reporting satisfies a threshold quantity.

In some examples of the method, apparatuses, and non-transitory computer-readable medium described herein, determining that the second condition may be met may include operations, features, means, or instructions for determining, after changing the priority level of the CSI reporting from the first priority level to the second priority level, that a threshold amount of time may have passed or that a threshold quantity of DRX cycles may have occurred.

In some examples of the method, apparatuses, and non-transitory computer-readable medium described herein, determining that the second condition may be met may include operations, features, means, or instructions for transmitting, to the UE, a WUS indicating for the UE to transition to an active state associated with the DRX mode, where changing the priority level of the CSI reporting from the second priority level to the first priority level based on transmitting the WUS.

In some examples of the method, apparatuses, and non-transitory computer-readable medium described herein, determining that the second condition may be met may include operations, features, means, or instructions for transmitting, to the UE, signaling including an indication for the UE to change the priority level of the CSI reporting from the second priority level to the first priority level, where changing the priority level of the CSI reporting from the second priority level to the first priority level based on transmitting the signaling.

Some examples of the method, apparatuses, and non-transitory computer-readable medium described herein may further include operations, features, means, or instructions for transmitting, to the UE, signaling including an indication of the condition to change the priority level of the CSI reporting from the first priority level to the second priority level.

Some examples of the method, apparatuses, and non-transitory computer-readable medium described herein may further include operations, features, means, or instructions for receiving, from the UE, a capability report, where the indication of the condition may be based on the capability report.

In some examples of the method, apparatuses, and non-transitory computer-readable medium described herein, the signaling further includes an indication of a second condition to change the priority level of the CSI reporting from the second priority level to the first priority level.

In some examples of the method, apparatuses, and non-transitory computer-readable medium described herein, the CSI reporting may be periodic or semi-persistent CSI reporting.

DETAILED DESCRIPTION

Figure 1:
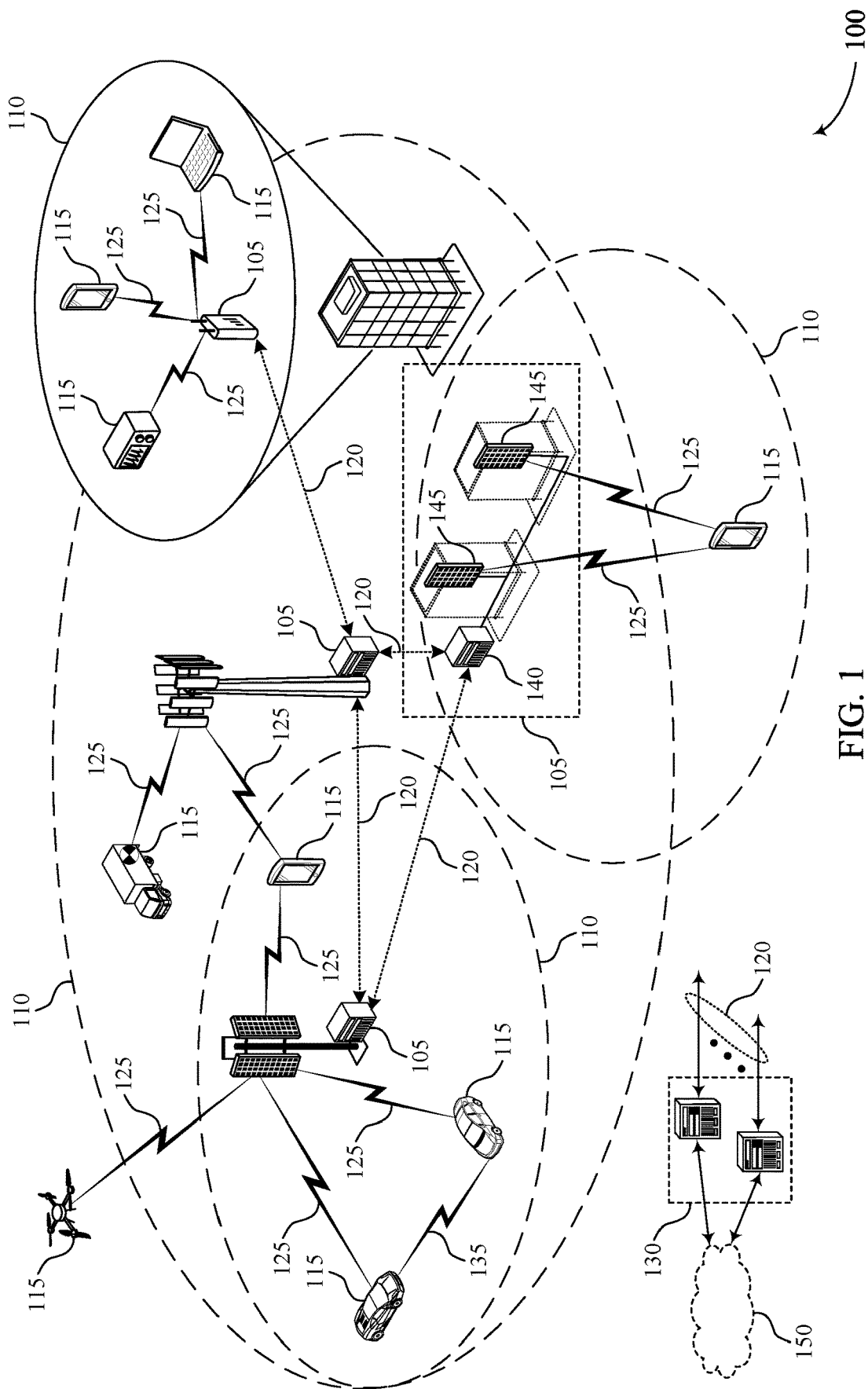
FIG. 1 illustrates an example of a wireless communications system that supports priority levels for channel state information (CSI) reporting in accordance with aspects of the present disclosure.

A user equipment (UE) may transmit uplink channels and/or signals to a base station, and in some cases, the uplink channels and/or signals may be associated with different priorities (e.g., a high priority or a low priority). If uplink signals or channels transmitted from the UE to the base station overlap, an uplink signal or channel with a higher priority (e.g., a high priority transmission) may be transmitted. In such cases, an uplink signal or channel with a lower priority (e.g., a low priority transmission) that overlaps the high priority transmission may be dropped, punctured by the high priority transmission, rate matched around the high priority transmission, or relocated (e.g., rescheduled to another transmission time).

In some cases, some types of channel state information (CSI) reporting (e.g., periodic or semi-persistent CSI reporting) may be assigned a lower priority than some other uplink channels or signals and thus may potentially not be transmitted for some period of time. For example, periodic or semi-persistent CSI reporting may be associated with a low priority and another, overlapping transmission may be associated with a high priority. If a CSI report for the periodic or semi-persistent CSI reporting overlaps with the high priority transmission, the CSI report may not be transmitted. And in some systems, when a UE is operating in a discontinuous reception (DRX) mode or state, the UE may be further limited to reporting at least some types of CSI during active DRX time periods and may miss reporting CSI during some of the active DRX time periods based on overlapping with higher priority transmissions. If one or more CSI reports overlap with higher priority transmissions, the UE may fail to transmit CSI reports for a period of time, and a quality or a reliability of communications with the base station may be reduced, and in some cases, beam failure or link failure may occur.

The present disclosure provides techniques for the UE and the base station to independently and concurrently (or nearly concurrently) determine to override a low priority for CSI reporting (e.g., periodic or semi-persistent CSI reporting) by at least temporarily elevating (increasing) the priority of the CSI reporting to high priority. If a condition is met, the UE and the base station may determine to change the priority of the CSI reporting to high. For example, the UE and the base station may assign a high priority to CSI reporting that occurs during a DRX inactive time, may assign a high priority to CSI reporting after the UE meets a threshold time duration outside of DRX active time, or may assign a high priority to CSI reporting after meeting a threshold time duration in which the UE does not report CSI, among other examples. The UE and the base station may change (e.g., decrease) the priority of the CSI reporting back to low priority if a second condition is met. For example, the UE may transmit a predetermined number of CSI reports, a threshold time duration may pass with the CSI reporting at high priority, the UE may transition to a DRX active time (e.g., the base station may transmit a wake-up signal (WUS) to the UE), or the base station may explicitly signal the UE to transition to low priority for CSI reporting, among other examples.

The base station may indicate to the UE (e.g., may configure the UE with) the condition for changing the priority of the CSI reporting to high priority, the second condition for changing back the priority of the CSI reporting, or both, and the base station and/or the UE may determine to change the priority of the CSI reporting based on the condition, the second condition, or both. When the priority for the CSI reporting is set to high priority, the UE may transmit one or more CSI reports to the base station, and the UE and the base station may change the priority of the CSI reporting back to low priority if the second condition is met. The base station may receive the one or more CSI reports and may adjust communication parameters (e.g., transmission power or beam parameters) based on the one or more CSI reports, which may result in increased communication quality between the UE and the base station, among other benefits that may be appreciated by one of ordinary skill in the art.

Aspects of the disclosure are initially described in the context of wireless communications systems. Aspects of the disclosure are further illustrated by and described with reference to a signaling diagram, a process flow, apparatus diagrams, system diagrams, and flowcharts that relate to priority levels for channel state information reporting.

FIG. 1 illustrates an example of a wireless communications system 100 that supports priority levels for CSI reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), and NB-IoT may include eNB-IoT (enhanced NB-IoT), FeNB-IoT (further enhanced NB-IoT).

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 and a base station 105 may communicate, and in some cases, the communications may include CSI reporting transmitted from the UE 115 to the base station 105. If a condition is met, the UE 115 and the base station 105 may determine to change the priority of at least some types of the CSI reporting (e.g., from low to high). For example, the UE 115 and the base station 105 may assign a high priority to periodic or semi-persistent CSI reporting (which may refer to CSI reporting that is scheduled semi-persistently (e.g., via radio resource control (RRC) signaling) or to occur periodically) that occurs during a DRX inactive time, may assign a high priority to periodic or semi-persistent CSI reporting after the UE 115 meets a threshold time duration outside of DRX active time, or may assign a high priority to periodic or semi-persistent CSI reporting after meeting a threshold time duration in which the UE 115 does not report CSI, among other examples. The UE 115 and the base station 105 may change the priority of the CSI reporting back to low priority if a second condition is met.

When the priority for the CSI reporting is set to high priority, the UE 115 may transmit one or more CSI reports to the base station 105. The base station 105 may receive the one or more CSI reports and may adjust communication parameters (e.g., transmission power or beam parameters) based on the one or more CSI reports, which may result in increased communication quality between the UE 115 and the base station 105.

Figure 2:
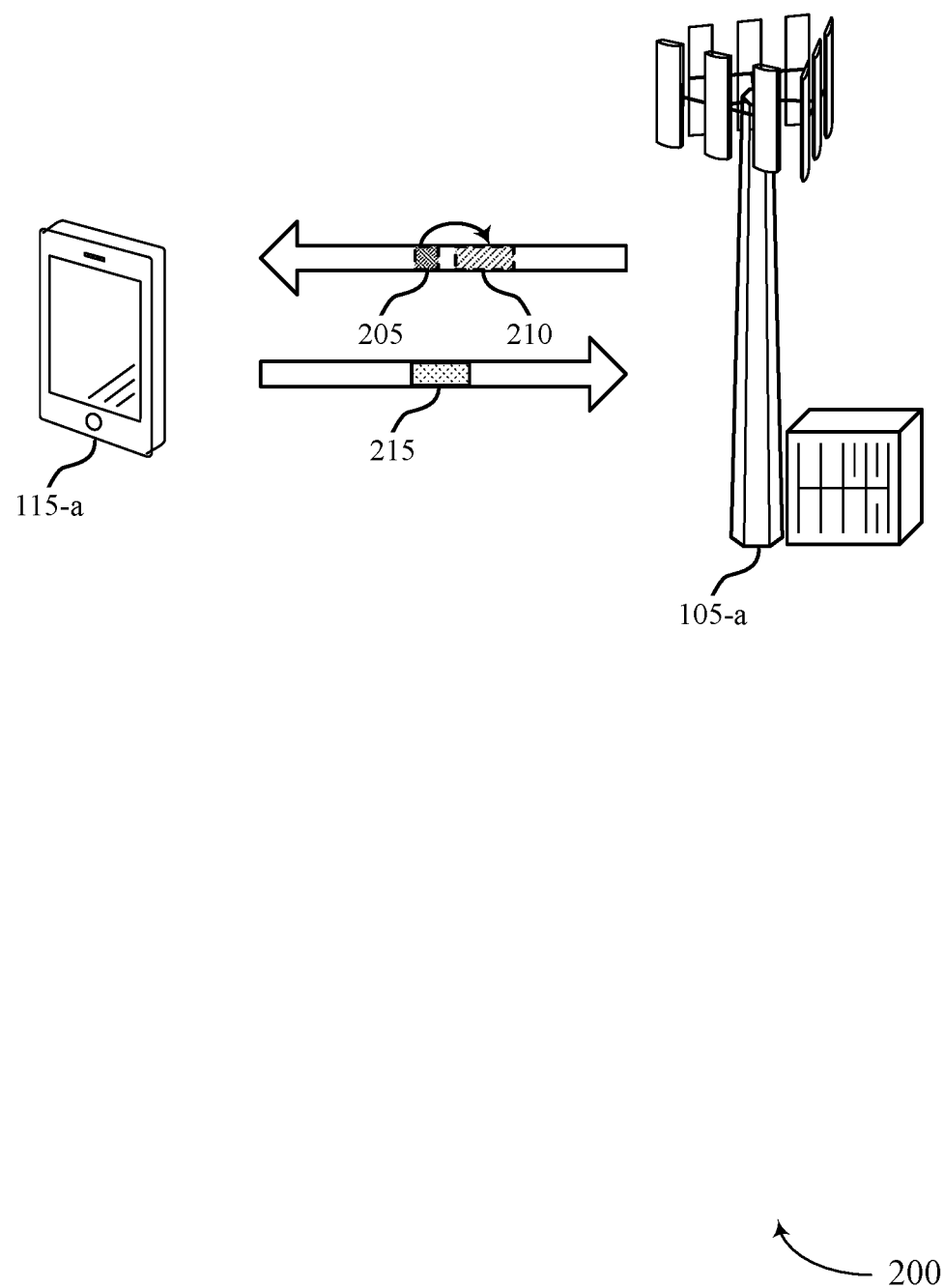
FIG. 2 illustrates an example of a wireless communications system that supports priority levels for CSI reporting in accordance with aspects of the present disclosure.

FIG. 2 illustrates an example of a wireless communications system 200 that supports priority levels for CSI reporting in accordance with aspects of the present disclosure. In some examples, wireless communications system 200 may implement aspects of wireless communications system 100. For example, wireless communications system 200 may include a base station 105-a and a UE 115-a, which may represent examples of a base station 105 and a UE 115 described with reference to FIG. 1.

In some cases, uplink channels and/or signals transmitted from UE 115-*a* to base station 105-*a* may be associated with a high priority or a low priority based on a type or quality of the channel or signal, or in some cases, different priorities may be associated with different wireless service types. For example, URLLC communications may be associated with a high priority and enhanced mobile broadband (eMBB) communications may be associated with a low priority. If uplink signals or channels transmitted from UE 115-*a* to base station 105-*a* overlap, an uplink signal or channel with a higher priority (e.g., a high priority transmission) may be transmitted. In such cases, an uplink signal or channel with a lower priority (e.g., a low priority transmission) that overlaps the high priority transmission may be dropped, punctured by the high priority transmission, rate matched around the high priority transmission, or relocated (e.g., rescheduled to another transmission time).

In some cases, some types of CSI reporting (e.g., periodic or semi-persistent CSI reporting) may be assigned a lower priority than some other uplink channels or signals, and may therefore not be transmitted for a period of time. For example, periodic or semi-persistent CSI reporting may be assigned a low priority and another, overlapping transmission may be assigned a high priority, such that a CSI report 215 for the periodic or semi-persistent CSI reporting may not be transmitted when overlapping with the high priority transmission. If one or more CSI reports 215 (e.g., CSI reporting opportunities or occasions) overlap with higher priority transmissions (e.g., high priority transmissions), UE 115-*a* may fail to transmit CSI reports 215 for a period of time, and in some cases UE 115-*a* may pass relatively long periods without transmitting a CSI report 215. For example, when operating in a DRX mode or state, UE 115-*a* may be limited to report CSI during active DRX time periods and may further miss reporting CSI during some of the active DRX time periods based on overlapping with higher priority transmissions. If UE 115-*a* does not measure and report CSI for a period of time, a quality or a reliability of communications with base station 105-*a* may be reduced, and in some cases, beam failure or link failure may occur.

The present disclosure provides techniques for UE 115-*a* and base station 105-*a* to independently and concurrently (or nearly concurrently) determine to override a low priority for CSI reporting (e.g., periodic or semi-persistent CSI reporting) by temporarily elevating the priority of the CSI reporting to high priority. If a condition is met, UE 115-*a* and base station 105-*a* may determine to change the priority of the CSI reporting to high. For example, UE 115-*a* and base station 105-*a* may assign a high priority to CSI reporting that occurs outside of DRX active time, may assign a high priority to CSI reporting after UE 115-*a* meets a threshold time duration outside of DRX active time, or may assign a high priority to CSI reporting after meeting a threshold time duration in which UE 115-*a* does not report CSI. UE 115-*a* and base station 105-*a* may change the priority of the CSI reporting back to low priority if a second condition is met. For example, UE 115-*a* may transmit a predetermined number of CSI reports 215, a threshold time duration may pass with the CSI reporting at high priority, UE 115-*a* may transition to a DRX active time (e.g., base station 105-*a* may transmit a WUS 205 to UE 115-*a* or UE 115-*a* may otherwise enter a DRX active state), or base station 105-*a* may explicitly signal UE 115-*a* to transition to low priority for CSI reporting.

Base station 105-*a* may indicate to UE 115-*a* (e.g., may configure UE 115-*a* with) the condition for changing the priority of the CSI reporting to high priority, the second condition for changing back the priority of the CSI reporting, or both. For example, base station 105-*a* may transmit an RRC configuration to UE 115-*a* configuring UE 115-*a* with the condition, the second condition, or both. Additionally or alternatively, base station 105-*a* may transmit an RRC configuration to UE 115-*a* indicating one or more options for the condition, the second condition, or both, and may transmit other signaling (e.g., a medium access control (MAC) control element (CE) or downlink control information (DCI)) to dynamically select the condition, the second condition, or both. In some cases, UE 115-*a* may transmit a capability report to base station 105-*a* (e.g., during an acquisition procedure) and base station 105-*a* may determine the condition, the second condition, or both, based on the capability report (e.g., based on one or more capabilities of UE 115-*a*).

In some cases, UE 115-*a* may be configured to operate in a DRX mode when determining to change the priority of the CSI reporting. The DRX mode may be associated with WUS operations for decreased power usage during DRX operations. For example, the WUS operations may support removal of some wake-up times during DRX mode (e.g., unnecessary wake-up times), which may increase power savings or decrease power usage. Base station 105-*a* may transmit a WUS 205 to UE 115-*a* in order to trigger UE 115-*a* to wake-up or to enter an active state for a time duration 210 of the DRX mode, which may be referred to as a DRX active time. UE 115-*a* may detect the WUS 205 and may enter an active state for the time duration 210, and may otherwise (e.g., if UE 115-*a* fails to detect the WUS 205) remain in an inactive state (e.g., a sleep mode) for the time duration 210 (e.g., may skip an active DRX time). In the active state, UE 115-*a* may monitor for a control message from base station 105-*a* in order to detect downlink data scheduling.

As a first example, the condition for changing the priority of the CSI reporting (e.g., periodic or semi-persistent CSI reporting) to high may be met when UE 115-*a* is configured to operate in a DRX mode associated with a WUS 205, and if the CSI reporting is configured to occur outside of an active time duration 210. For example, UE 115-*a* may be configured to report periodic or semi-persistent CSI feedback during a time duration 210 configured for UE 115-*a*, but during which UE 115-*a* may not be activated. UE 115-*a* may accordingly measure one or more reference signals (e.g., CSI-RS) during the time duration 210 (e.g., an inactive DRX time) and may transmit a CSI report 215 at a high priority level, where the CSI report 215 may be based on the reference signal measurement. In some cases, UE 115-*a* may maintain a low priority for CSI reporting associated with a time duration 210 in which UE 115-*a* may be activated (e.g., a DRX active time).

As a second example, the condition for changing the priority of the CSI reporting (e.g., periodic or semi-persistent CSI reporting) to high may be met when UE 115-*a* is configured to operate in a DRX mode associated with a WUS 205 and has stayed outside of an active state (e.g., outside of DRX active time) for a threshold amount of time. For example, if UE 115-*a* or base station 105-*a* determines that UE 115-*a* has stayed outside of a DRX active time for a configured threshold amount of time, UE 115-*a* or base station 105-*a*, or both, may change the priority of the CSI reporting to high. The threshold amount of time may include a threshold time duration (e.g., in milliseconds) or a threshold number of DRX cycles.

As a third example, the condition for changing the priority of the CSI reporting (e.g., periodic or semi-persistent CSI reporting) to high may be met when UE 115-*a* has passed a threshold amount of time without transmitting a CSI report 215 (e.g., or base station 105-*a* has passed a threshold amount of time without receiving a CSI report 215). For example, if UE 115-*a* or base station 105-*a* determines that UE 115-*a* has not transmitted a CSI report 215 for a configured threshold amount of time, UE 115-*a* or base station 105-*a* may change the priority of the CSI reporting to high. The threshold amount of time may include a threshold time duration (e.g., in milliseconds) or a threshold number of DRX cycles configured for UE 115-*a*. In some cases, the threshold amount of time may include a number of contiguous (e.g., consecutive) CSI reporting occasions in which UE 115-*a* fails to transmit a CSI report 215 (e.g., in which UE 115-*a* loses CSI reporting opportunities because of overlap with a high priority transmission).

As described herein, when the priority for the CSI reporting is set to high priority, UE 115-*a* may transmit one or more CSI reports 215 to base station 105-*a* (e.g., based on one or more reference signal measurements made at UE 115-*a*), and UE 115-*a* and base station 105-*a* may change the priority of the CSI reporting back to low priority if a second condition is met. Base station 105-*a* may receive the one or more CSI reports 215 and may adjust communication parameters (e.g., transmission power or beam parameters) based on the one or more CSI reports 215, which may result in increased communication quality between UE 115-*a* and base station 105-*a*.

Figure 3:
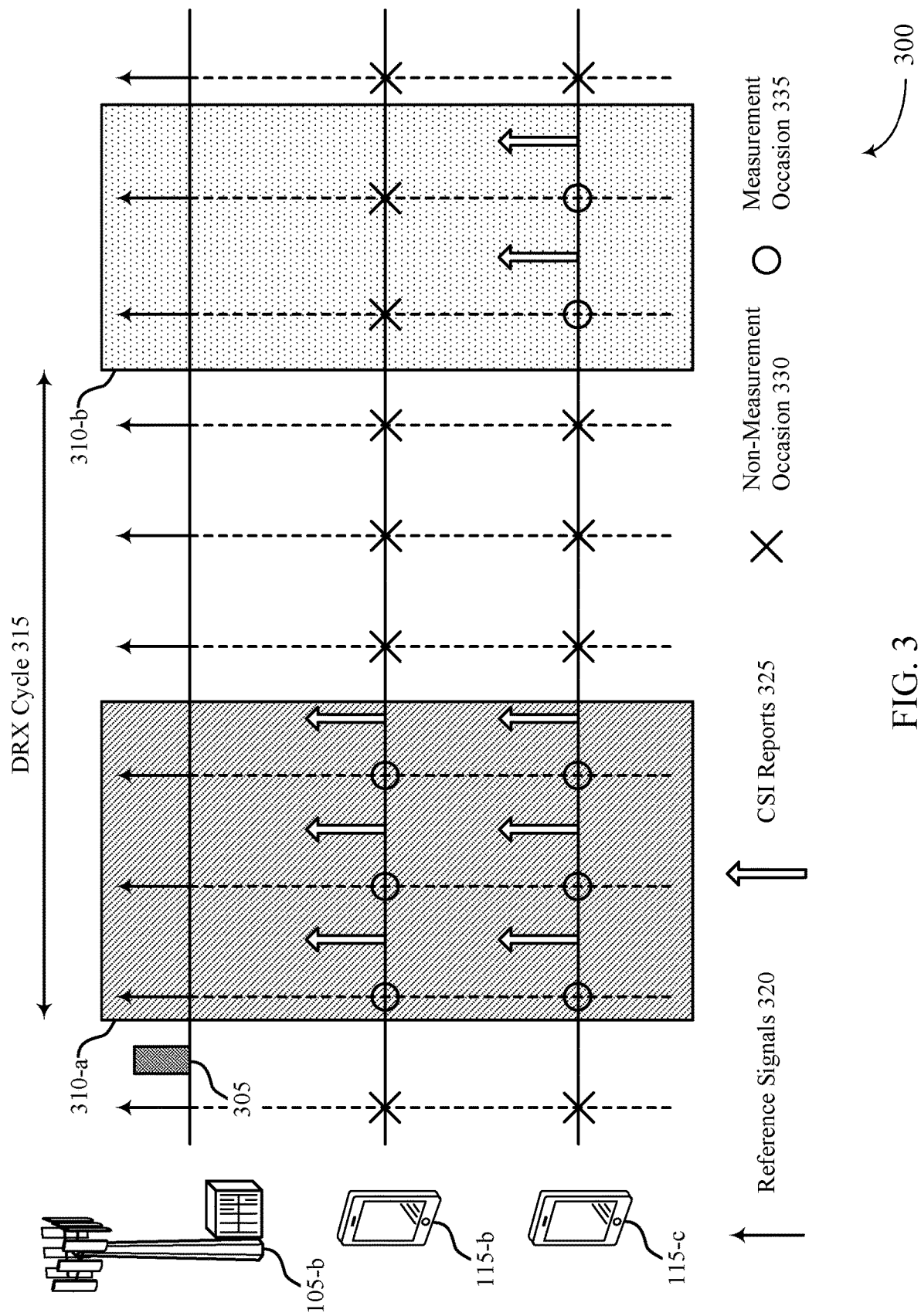
FIG. 3 illustrates an example of a signaling diagram that supports priority levels for CSI reporting in accordance with aspects of the present disclosure.

FIG. 3 illustrates an example of a signaling diagram 300 that supports priority levels for CSI reporting in accordance with aspects of the present disclosure. In some examples, signaling diagram 300 may implement aspects of wireless communications system 100 or 200. For example, signaling diagram 300 may include or be implemented by a base station 105-*b* and UEs 115-*b* and 115-*c*, which may represent examples of a base station 105 and UEs 115 described with reference to FIGS. 1 and 2.

In some cases, as described with reference to FIG. 2, a UE 115 may be configured to operate in a DRX mode when determining to change a priority of CSI reporting, where the DRX mode may be associated with WUS operations. In the example illustrated by FIG. 3, UEs 115-*b* and 115-*c* may be configured to operate in a DRX mode when communicating with base station 105-*b*. Configured time durations 310 may be indicated by a DRX timer (e.g., a drx-onDurationTimer) at UE 115-*b*, UE 115-*c*, or base station 105-*b*, and may correspond to a portion of a DRX cycle 315 during which a UE 115 may enter an active state if a WUS 305 is received by the UE 115. In some examples, UE 115-*c* may further be configured (e.g., by base station 105-*b*) to change a priority of the CSI reporting based on one or more conditions, for example, as described with reference to FIG. 2.

In some cases, UE 115-*b* may be configured to report CSI (e.g., periodic and/or semi-persistent CSI) during DRX active time (e.g., when a configured time duration 310 is activated by receiving a WUS 305). UE 115-*c* may be configured to report CSI (e.g., periodic and/or semi-persistent CSI) during DRX active time or during DRX inactive time. For example, base station 105-*b* may configure UE 115-*c* to perform CSI measurements and periodic or semi-persistent CSI reporting during configured time durations 310, even if a WUS 305 is not received by UE 115-*c* to set the time duration 310 to active (e.g., before time duration 310-*b*, which may represent an inactive time duration 310). Base station 105-*b* may additionally or alternatively configure UE 115-*c* to perform layer 1 reference signal received power (L1-RSRP) measurements and associated reporting (e.g., L1-RSRP reporting via a CSI report) during configured time durations 310, even if a WUS 305 is not received by UE 115-*c* to set the time duration 310 to active. Base station 105-*b* may configure UE 115-*c* to perform the CSI and/or L1-RSRP reporting during inactive configured time durations 310 by enabling a respective higher layer parameter (e.g., PS_Periodic_CSI_TransmitOrNot or PS_Periodic_L1-RSRP_TransmitOrNot).

Base station 105-*b* may transmit reference signals 320 (e.g., CSI-RS) associated with CSI measurements and reporting (e.g., semi-persistent or periodic CSI reporting). If UE 115-*b* or 115-*c* is configured to perform CSI reporting during a time in which base station 105-*b* transmits the reference signals 320, UE 115-*b* or UE 115-*c* may measure one or more of the reference signals 320 and may create a CSI report 325 based on the one or more measured reference signals 320. For example, as described herein, UE 115-*b* may be configured to perform CSI reporting during DRX active time and UE 115-*c* may be configured to perform CSI reporting during DRX active time and some DRX inactive times. Base station 105-*b* may transmit a WUS 305 to UEs 115-*b* and 115-*c* before configured time duration 310-*a*, which may indicate that configured time duration 310-*a* represents a DRX active time for UEs 115-*b* and 115-*c*. UEs 115-*b* and 115-*c* may enter an active state for configured time duration 310-*a*, may measure reference signals at measurement occasions 335 within the configured time duration 310-*a*, and may transmit corresponding CSI reports 325 to base station 105-*b*. In some cases, measuring a reference signal at a measurement occasion 335 may be based on having a related CSI reporting priority elevated such that a CSI report 325 based on the measurement occasion 335 will be transmitted (or is at least more likely to be transmitted) due to the CSI reporting priority being elevated. That is, in some cases, performing measurements at a measurement occasion 335, transmitting a CSI report 325 based on the measurement occasion 335, or both, may be based on the CSI reporting priority being elevated in that the measurement occasion 335, the CSI report 325, or both, would not have occurred but for the CSI reporting priority being elevated.

After configured time duration 310-*a*, UEs 115-*b* and 115-*c* may exit the active state and may accordingly refrain from measuring reference signals 320 from base station 105-*b*, for example, as represented by non-measurement occasions 330. In some cases, base station 105-*b* may refrain from transmitting a WUS 305 to UEs 115-*b* and 115-*c* before configured time duration 310-*b*, which may indicate that configured time duration 310-*b* represents a DRX inactive time for UEs 115-*b* and 115-*c*. Accordingly, UE 115-*b* may refrain from performing CSI reporting during configured time duration 310-*b*. UE 115-*c* may be configured to perform CSI reporting even when a WUS 305 is not received, and may perform CSI reporting during configured time duration 310-*b*. For example, UE 115-*c* may measure reference signals at measurement occasions 335 and may transmit corresponding CSI reports 325 to base station 105-*b*.

As described with reference to FIG. 2, some CSI reports 325 (e.g., CSI reporting opportunities or occasions) may overlap with higher priority transmissions (e.g., having a high priority level), such as a physical uplink shared channel (PUSCH) (e.g., associated with a configured grant or a dynamic grant), hybrid automatic repeat request (HARD) feedback, a scheduling request, aperiodic sounding reference signals, or the like. In some cases, aperiodic or semi-persistent CSI reporting may be transmitted on a PUSCH and may share a same priority as the PUSCH (e.g., indicated via a control message scheduling the PUSCH). As such, some CSI reporting (e.g., aperiodic CSI reporting) may have a high priority, for example, if an associated PUSCH has a high priority. In some cases, aperiodic CSI reporting may be limited to transmission outside of DRX modes, which may limit available CSI reporting during DRX mode to low priority CSI reporting (e.g., periodic or semi-persistent CSI reporting). If low priority CSI reports 325 overlap with higher priority transmissions from UE 115-b or 115-c, UE 115-b or 115-c may fail to transmit CSI reports 325 for a period of time, such that a quality or a reliability of communications between the respective UE 115 and base station 105-b may be reduced.

Accordingly, as described herein, base station 105-b may configure UE 115-c (e.g., and in some cases, may configure UE 115-b) to change a priority of the CSI reporting to a high priority level. For example, base station 105-b may configure UE 115-c with a condition for changing the priority of the CSI reporting to a high priority level. Base station 105-b may also change a priority of the CSI reporting from UE 115-c to a high priority level concurrently (or nearly concurrently) with UE 115-c and based on the same condition configured for UE 115-c.

As a first example, the condition for changing the priority of the CSI reporting to high may be met when performing the CSI reporting outside of an active configured time duration 310. For example, UE 115-c or base station 105-b may change CSI reporting to a high priority level during configured time duration 310-b (e.g., an inactive DRX time) and not during configured time duration 310-a (e.g., an active DRX time).

As a second example, the condition for changing the priority of the CSI reporting to high may be met when UE 115-c has stayed outside of an active state (e.g., an active configured time duration 310) for a threshold amount of time. For example, if UE 115-c or base station 105-b determines that UE 115-c has stayed outside of a DRX active time for a threshold amount of time, UE 115-c or base station 105-b may change the priority of the CSI reporting for UE 115-c to high. The threshold amount of time may include a threshold time duration (e.g., in milliseconds) or a threshold number of DRX cycles 315. In one example, UE 115-c or base station 105-b may determine that UE 115-c has stayed outside of DRX active time for a threshold amount of time before configured time duration 310-a (e.g., or configured time duration 310-b) and may change the priority of the CSI reporting for UE 115-c to high.

As a third example, the condition for changing the priority of the CSI reporting to high may be met when UE 115-c fails to transmit a CSI report 325 for a threshold amount of time. The threshold amount of time may include a threshold time duration (e.g., in milliseconds) or a threshold number of DRX cycles 315. In some cases, the threshold amount of time may include a number of contiguous (e.g., consecutive) CSI reporting occasions in which UE 115-c fails to transmit a CSI report 325 (e.g., in which UE 115-c loses CSI reporting opportunities).

In some examples, UE 115-c or base station 105-b may determine that UE 115-c has not transmitted a CSI report 325 for a threshold amount of time before configured time duration 310-a and may change the priority of the CSI reporting for UE 115-c to high. Accordingly, UE 115-c may transmit one or more CSI reports 325 during configured time duration 310-a with a high priority. In another example, UE 115-c may fail to transmit CSI reports 325 during configured time duration 310-a due to overlap with higher priority transmissions. UE 115-c or base station 105-b may therefore determine that UE 115-c has not transmitted a CSI report 325 for a threshold amount of time before time duration 310-b and may change the priority of the CSI reporting for UE 115-c to high. Accordingly, UE 115-c may transmit one or more CSI reports 325 during configured time duration 310-b with a high priority.

When the priority for the CSI reporting is changed to a high priority, UE 115-c may transmit one or more CSI reports 325 to base station 105-b, and UE 115-c may change the priority of the CSI reporting back to low priority if a second condition is met. Base station 105-b may receive the one or more CSI reports 325 and may adjust communication parameters (e.g., transmission power or beam parameters) based on the one or more CSI reports 325, which may result in increased communication quality between UE 115-c and base station 105-b.

Figure 4:
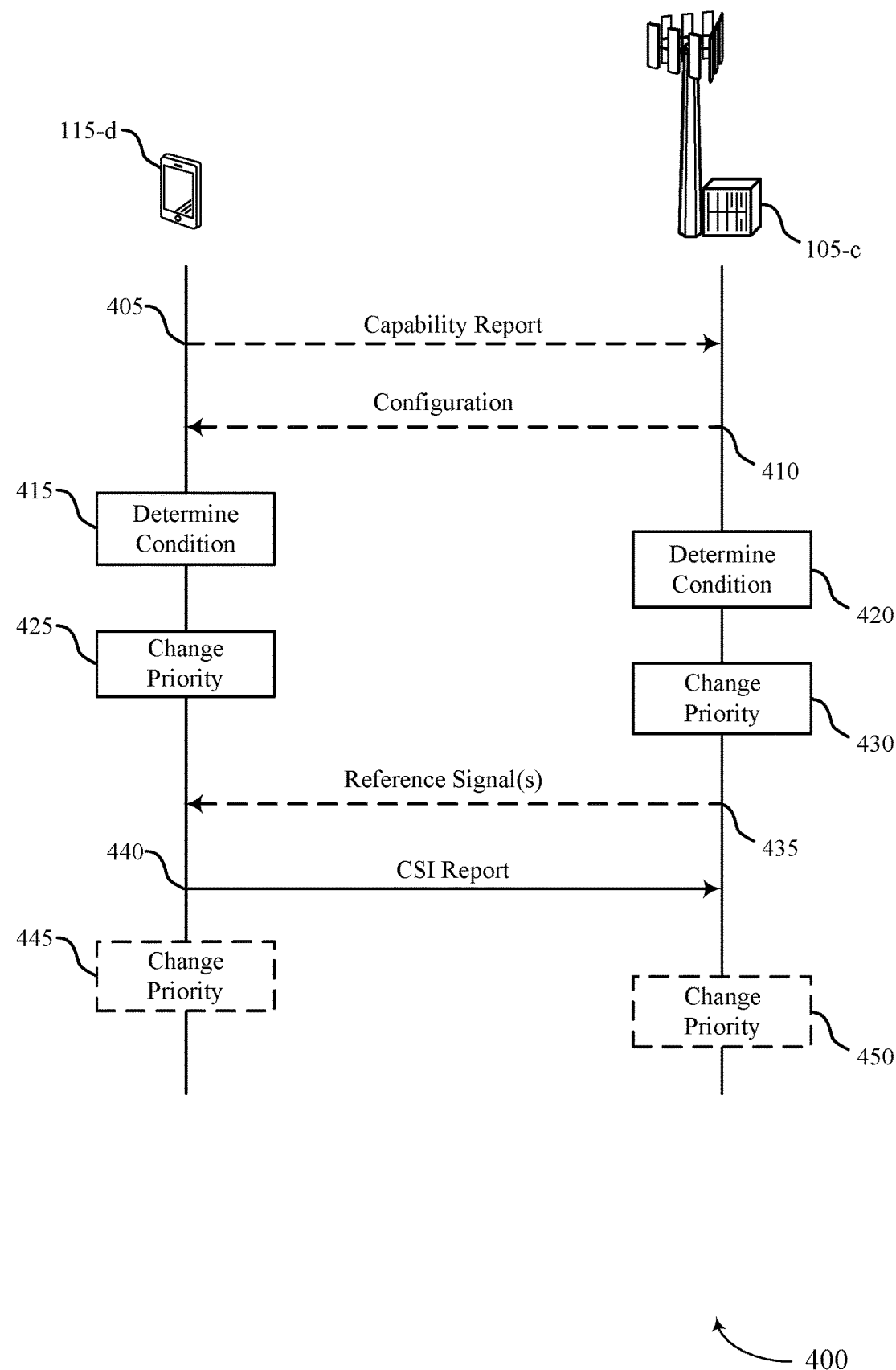
FIG. 4 illustrates an example of a process flow that supports priority levels for CSI reporting in accordance with aspects of the present disclosure.

FIG. 4 illustrates an example of a process flow 400 that supports priority levels for CSI reporting in accordance with aspects of the present disclosure. In some examples, process flow 400 may implement or be implemented by aspects of wireless communications system 100 or 200. For example, process flow may include or be implemented by a base station 105-c and a UE 115-d, which may represent examples of a base station 105 and a UE 115 described with reference to FIGS. 1-3. As described with reference to FIGS. 2 and 3, UE 115-d and base station 105-c may implement techniques for changing a priority of CSI reporting transmitted from UE 115-d to base station 105-c.

In the following description of process flow 400, the operations between UE 115-d and base station 105-c may be transmitted in a different order than the order shown, or the operations performed by UE 115-d and base station 105-c may be performed in different orders or at different times. Some operations may also be left out of process flow 400, or other operations may be added to process flow 400. Although UE 115-d and base station 105-c are shown performing the operations of process flow 400, some aspects of some operations may also be performed by one or more other wireless devices.

At 405, in some cases, UE 115-d may transmit a capability report to base station 105-c. The capability report may include information regarding one or more capabilities of UE 115-d, which may be associated with changing a priority of CSI reporting (e.g., periodic or semi-persistent CSI reporting). For example, the capability report may include an indication of one or more timers or counters at UE 115-d that may support tracking an amount of time outside of DRX active time, an amount of time without transmitting a CSI report, or a number of missed CSI reports.

At 410, in some cases, base station 105-c may configure (e.g., transmit an indication of a configuration to) UE 115-d for changing a priority of the CSI reporting. The configuration may indicate, for example, a condition for changing a priority level of the CSI reporting from a low priority level (e.g., a first priority level) to a high priority level (e.g., a second priority level). In some cases, the configuration may indicate a second condition for changing the priority level of the CSI reporting from a high priority level to a low priority level. In some cases, the configuration may be based on the capability report or another indication of the capabilities of UE 115-d.

In some cases, the configuration may include a configuration message (e.g., an RRC message) configuring UE 115-d with the condition, the second condition, or both. In some cases, the configuration may include a configuration message (e.g., an RRC message) configuring UE 115-d with possible options for the condition, the second condition, or both. Further signaling from base station 105-c (e.g., including the configuration, or other signaling) may include a second message (e.g., a DCI or MAC CE) activating one of the options for the condition, the second condition, or both.

At 415, UE 115-d may determine that the condition is met for changing the priority level of the CSI reporting. At 420, base station 105-c may determine that the condition is met for changing the priority level of the CSI reporting. In some cases, UE 115-d and base station 105-c may concurrently (or nearly concurrently) determine that the condition is met for changing the priority level. For example, base station 105-c or UE 115-d may determine that the condition is met if the CSI reporting is configured to occur outside of DRX active time, if UE 115-d meets a threshold time duration outside of DRX active time, or if UE 115-d meets a threshold time duration in which UE 115-d does not report CSI.

At 425, UE 115-d may change the priority level of the CSI reporting from a low priority level to a high priority level based on determining that the condition is met. At 430, base station 105-c may change the priority level of the CSI reporting from a low priority level to a high priority level based on determining that the condition is met. In some cases, UE 115-d and base station 105-c may concurrently (or nearly concurrently) change the priority level of the CSI reporting from a low priority level to a high priority level.

At 435, base station 105-c may transmit one or more reference signals to UE 115-d. For example, base station 105-c may transmit one or more CSI-RS to UE 115-d, and UE 115-d may measure the one or more CSI-RS and may create a CSI report based on the measurement of the one or more CSI-RS. In some cases, the UE 115-d may measure the one or more CSI-RS based on having changed the priority level of the CSI reporting at 425, as this may increase the likelihood of a related CSI report being transmitted.

At 440, UE 115-d may transmit, to base station 105-c, a CSI report based on the CSI reporting having the high priority level. For example, the CSI report may be transmitted at 440 due to the CSI reporting having the high priority level, and thus despite a collision or other conflict that may have otherwise resulted in the CSI report not being transmitted. In some cases, one or more uplink transmissions may overlap at UE 115-d and UE 115-d may transit the CSI report based on the CSI report having a higher priority than other uplink transmissions or based on the CSI report having a high priority. In some cases, UE 115-d may transmit the CSI report based on the measurements of the one or more reference signals. Base station 105-c may receive the CSI report based on the CSI report having a higher priority than other uplink transmissions, or based on having a high priority. In some cases, base station 105-c may adjust or alter one or more communication parameters based on the CSI report, which may increase communication quality between UE 115-d and base station 105-c.

At 445, UE 115-d may determine that the second condition is met for changing the priority level of the CSI reporting from the high priority level to the low priority level. At 450, base station 105-c may determine that the second condition is met for changing the priority level of the CSI reporting from the high priority level to the low priority level. UE 115-d and/or base station 105-c may change the priority level of the CSI reporting from the high priority level to the low priority level based on the determining. In some cases, UE 115-d and base station 105-c may concurrently (or nearly concurrently) determine that the second condition is met for changing the priority level and may concurrently (or nearly concurrently) change the priority level of the CSI reporting from the high priority level to the low priority level.

The second condition may be met, in some examples, if a number of CSI reports are transmitted by UE 115-d or if a predefined duration of time passes with CSI reporting set to high priority. The number of CSI reports transmitted by UE 115-d (e.g., or received by base station 105-c) may be a configured number of CSI reports, such as at least one CSI report. The predefined duration of time may be an amount of time (e.g., in milliseconds) or a number of DRX cycles that is based on a timer or counter (e.g., at UE 115-d and/or base station 105-c). In some cases, the timer or counter associated with tracking the time duration may restart if UE 115-d is unable to report CSI during the time duration (e.g., if UE 115-d misses one or more CSI reporting opportunities or if no CSI reporting opportunities occur).

In some examples, the second condition may be met if UE 115-d transitions to a DRX active time or active DRX state (e.g., base station 105-c transmits a WUS to UE 115-d), or if base station 105-c transmits an indication to UE 115-d to change the priority level. In some cases, base station 105-c may determine to change the priority level of the CSI reporting to a low priority level and may accordingly transmit the WUS or the indication to UE 115-d. In a first example, UE 115-d and/or base station 105-c may, in some cases, be configured to change the priority level of the CSI reporting to a low priority level if UE 115-d enters an active state (e.g., an active DRX time). In some cases, UE 115-d may autonomously wake up from a DRX inactive state to a DRX active state (e.g., according to a configured schedule or otherwise, and which may be independent or unrelated to a WUS), which may satisfy the second condition. In some cases, UE 115-d may enter a DRX active state based on a WUS received from base station 105-c. In a second example, base station 105-c may transmit an explicit indication to UE 115-d (e.g., via RRC signaling, a MAC CE, or a DCI), indicating for UE 115-d and/or base station 105-c to change the priority level of the CSI reporting to a low priority level.

Figure 5:
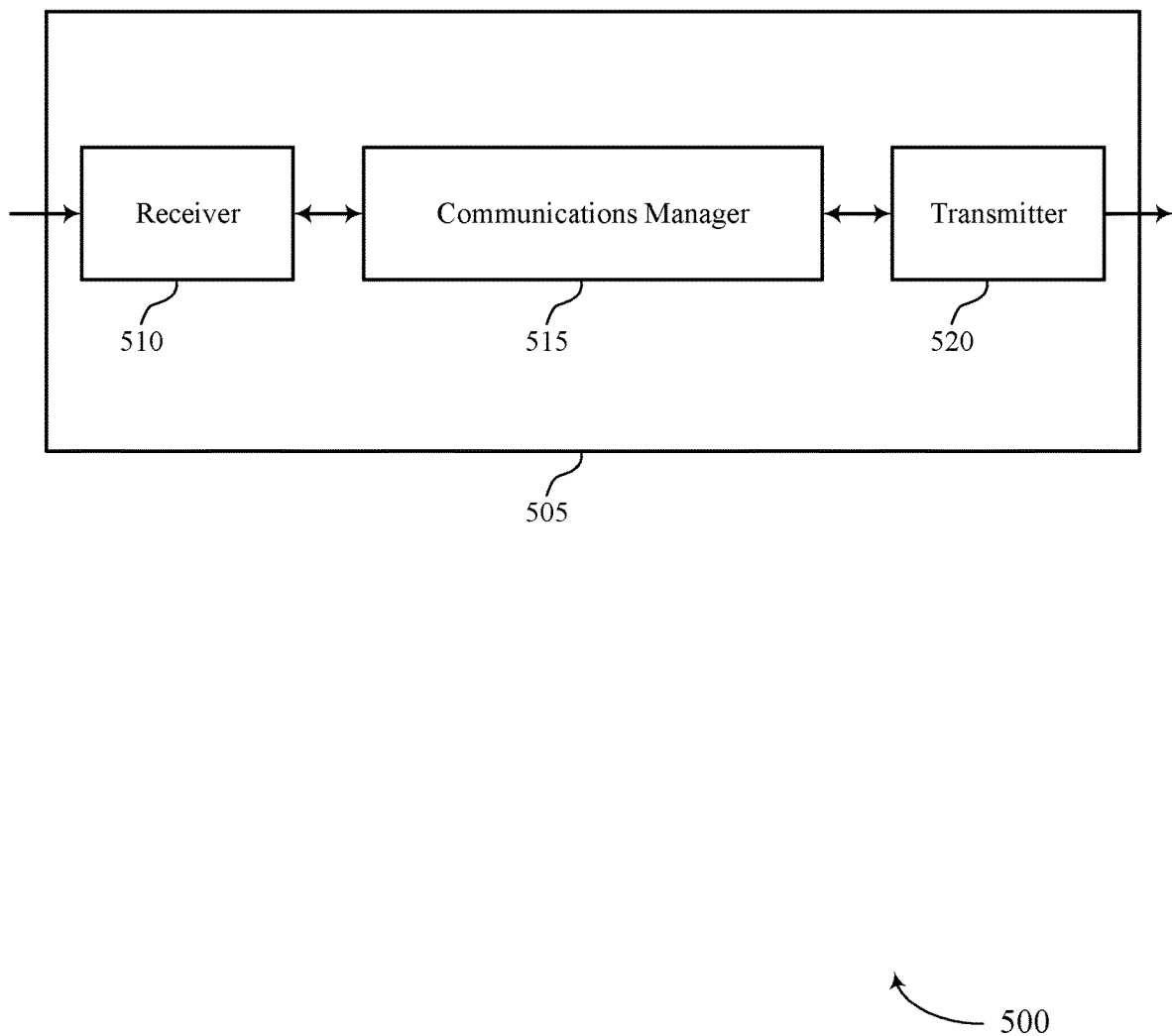
FIGS. 5 and 6 show block diagrams of devices that support priority levels for CSI reporting in accordance with aspects of the present disclosure.

FIG. 5 shows a block diagram 500 of a device 505 that supports priority levels for CSI reporting in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to priority levels for CSI reporting). Information may be passed on to other components of the device 505. The receiver 510 may be an example of aspects of the transceiver 820 described with reference to FIG. 8. The receiver 510 may utilize a single antenna or a set of antennas.

The communications manager 515 may determine that a condition is met for a change in a priority level of CSI reporting associated with communications between the UE and a base station, change the priority level of the CSI reporting from a first priority level to a second priority level based on determining that the condition is met, and transmit, to the base station, a CSI report based on the CSI reporting having the second priority level. The communications manager 515 may be an example of aspects of the communications manager 810 described herein.

The communications manager 515, or its sub-components, may be implemented in hardware, software (e.g., executed by a processor), or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515, among other examples herein, may be implemented to realize one or more potential advantages. For example, communications manager 515 may increase communication quality and throughput at a wireless device (e.g., a UE 115) by supporting a change in a priority level of CSI reporting. The change in the priority level may support link adaptation and result in increased communication quality or throughput (or any combination thereof) due to an increased likelihood of transmitting CSI reports, compared to other systems and techniques, for example, that do not support a change in a priority level of CSI reporting. Accordingly, communications manager 515 may save power and increase battery life at a wireless device (e.g., a UE 115) by strategically increasing a quality of communications at a wireless device (e.g., a UE 115).

Figure 6:
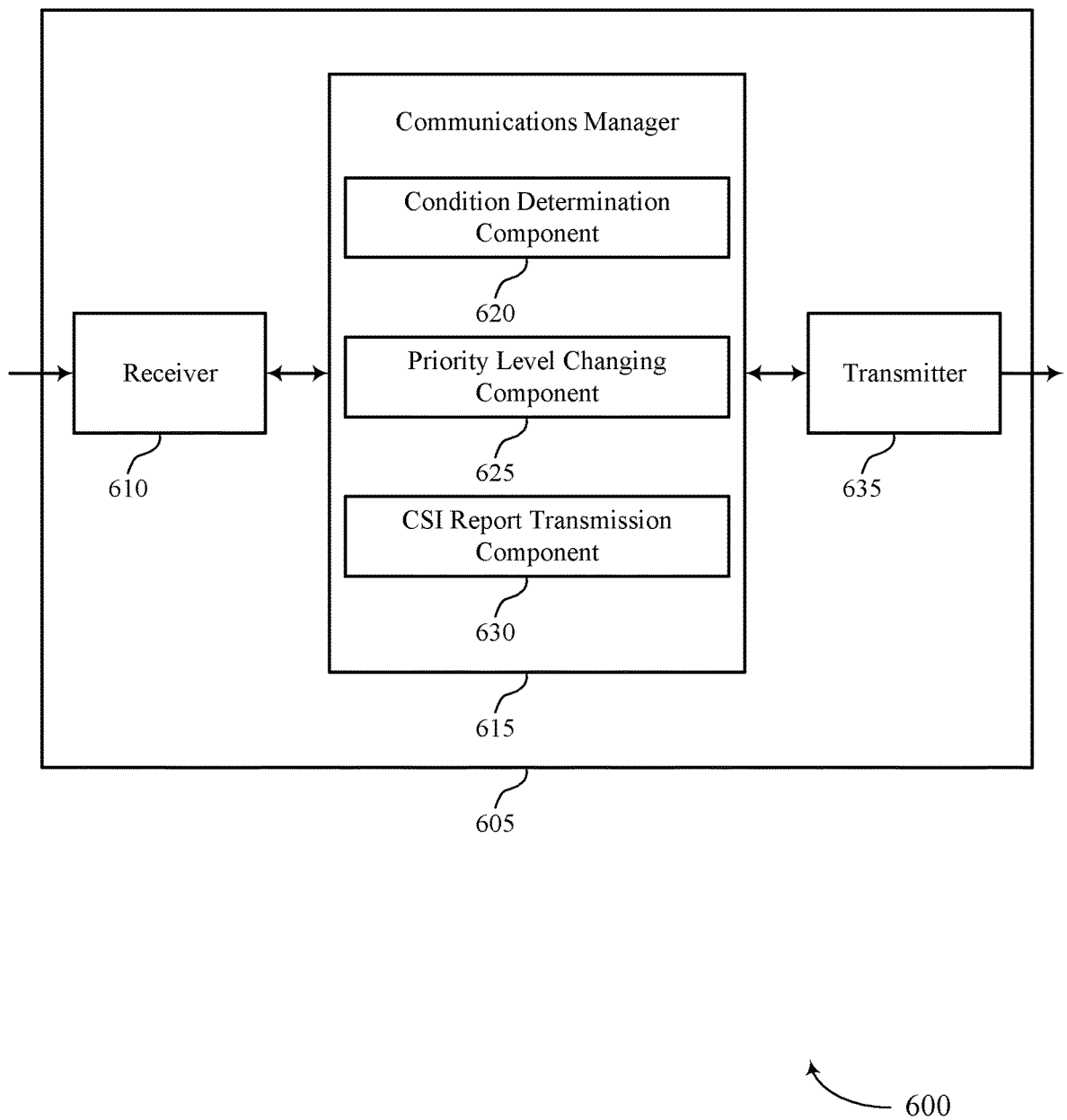

FIG. 6 shows a block diagram 600 of a device 605 that supports priority levels for CSI reporting in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to priority levels for CSI reporting). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a condition determination component 620, a priority level changing component 625, and a CSI report transmission component 630. The communications manager 615 may be an example of aspects of the communications manager 810 described herein.

The condition determination component 620 may determine that a condition is met for a change in a priority level of CSI reporting associated with communications between the UE and a base station. The priority level changing component 625 may change the priority level of the CSI reporting from a first priority level to a second priority level based on determining that the condition is met. The CSI report transmission component 630 may transmit, to the base station, a CSI report based on the CSI reporting having the second priority level.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

A processor of a wireless device (e.g., controlling the receiver 610, the transmitter 635, or the transceiver 820 as described with reference to FIG. 8) may increase communication reliability, quality, and throughput. The increased communication quality and throughput may reduce power consumption (e.g., via implementation of system components described with reference to FIG. 7) compared to other systems and techniques, for example, that do not support a change in a priority level of CSI reporting, which may decrease communication quality and increase power consumption. Further, the processor of the UE 115 may identify one or more aspects of condition to change a priority level of CSI reporting to perform the processes described herein. The processor of the wireless device may use the condition to perform one or more actions that may result in increased communication quality and power consumption, as well as save power and increase battery life at the wireless device (e.g., by strategically supporting CSI report transmission, which may increase communication quality), among other benefits.

Figure 7:
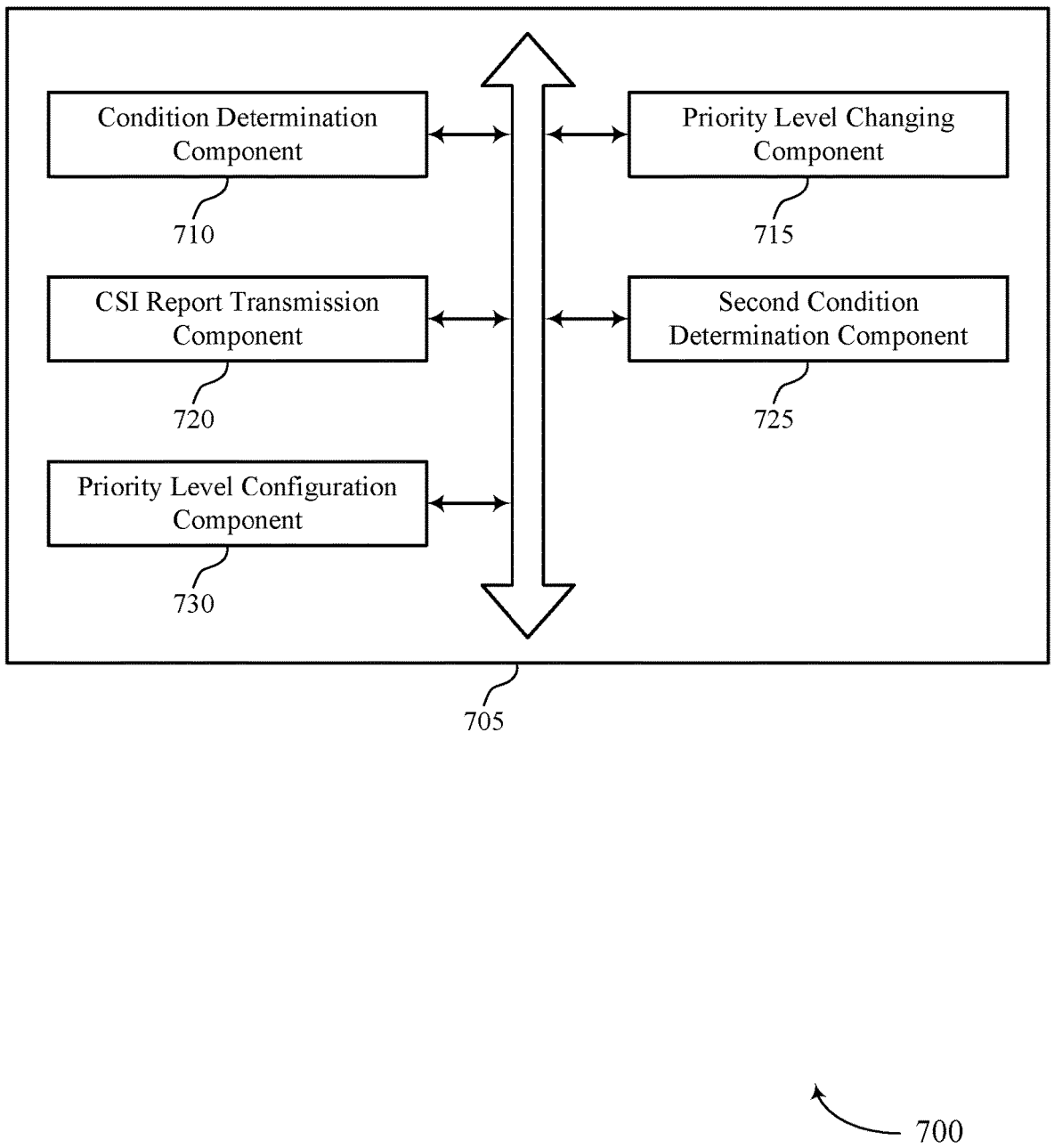
FIG. 7 shows a block diagram of a communications manager that supports priority levels for CSI reporting in accordance with aspects of the present disclosure.

FIG. 7 shows a block diagram 700 of a communications manager 705 that supports priority levels for CSI reporting in accordance with aspects of the present disclosure. The communications manager 705 may be an example of aspects of a communications manager 515, a communications manager 615, or a communications manager 810 described herein. The communications manager 705 may include a condition determination component 710, a priority level changing component 715, a CSI report transmission component 720, a second condition determination component 725, and a priority level configuration component 730. Each of these modules may communicate, directly or indirectly, with one another (e.g., via one or more buses).

The condition determination component 710 may determine that a condition is met for a change in a priority level of CSI reporting associated with communications between the UE and a base station. In some cases, the CSI reporting is periodic or semi-persistent CSI reporting. In some examples, the condition determination component 710 may identify that the UE is configured for a DRX mode that is associated with a WUS. In some examples, the condition determination component 710 may determine that the CSI reporting is configured to be performed outside of an active time for the DRX mode, where changing the priority level is based on determining that the CSI reporting is configured to be performed outside of the active time.

In some examples, the condition determination component 710 may identify that the UE is configured for a DRX mode that is associated with an active time. In some examples, the condition determination component 710 may determine that the UE has operated in the DRX mode and outside of the active time for a duration that satisfies a threshold, where changing the priority level is based on the duration satisfying the threshold. In some cases, the threshold may include a threshold amount of time or a threshold number of DRX cycles, where each DRX cycle includes a respective potential active time.

In some examples, the condition determination component 710 may transmit a prior CSI report in accordance with the CSI reporting. In some examples, the condition determination component 710 may determine that an amount of time since transmitting the prior CSI report satisfies a threshold, where changing the priority level is based on determining that the amount of time since transmitting the prior CSI report satisfies the threshold. In some cases, the threshold may include a threshold amount of time, or threshold number of DRX cycles, or a threshold number of missed reporting occasions for the CSI reporting.

The priority level changing component 715 may change the priority level of the CSI reporting from a first priority level to a second priority level based on determining that the condition is met. In some examples, the priority level changing component 715 may change the priority level of the CSI reporting from the second priority level to the first priority level based on determining that a second condition is met. In some cases, the second priority level is higher than the first priority level.

The CSI report transmission component 720 may transmit, to the base station, a CSI report based on the CSI reporting having the second priority level.

The second condition determination component 725 may determine that a second condition is met for a change in the priority level of the CSI reporting. In some examples, the second condition determination component 725 may determine, based on transmitting the CSI report, that a quantity of CSI reports transmitted in accordance with the CSI reporting satisfies a threshold quantity. In some examples, the second condition determination component 725 may determine, after changing the priority level of the CSI reporting from the first priority level to the second priority level, that a threshold amount of time has passed or that a threshold quantity of DRX cycles have occurred. In some examples, the second condition determination component 725 may receive, from the base station, a WUS indicating for the UE to transition to an active state associated with the DRX mode. In some examples, the second condition determination component 725 may receive, from the base station, signaling including an indication for the UE to change the priority level of the CSI reporting from the second priority level to the first priority level.

The priority level configuration component 730 may receive, from the base station, signaling including an indication of the condition for the UE to change the priority level of the CSI reporting from the first priority level to the second priority level. In some examples, the priority level configuration component 730 may transmit, to the base station, a capability report, where the indication of the condition is based on the capability report. In some cases, the signaling further includes an indication of a second condition for the UE to change the priority level of the CSI reporting from the second priority level to the first priority level.

Figure 8:
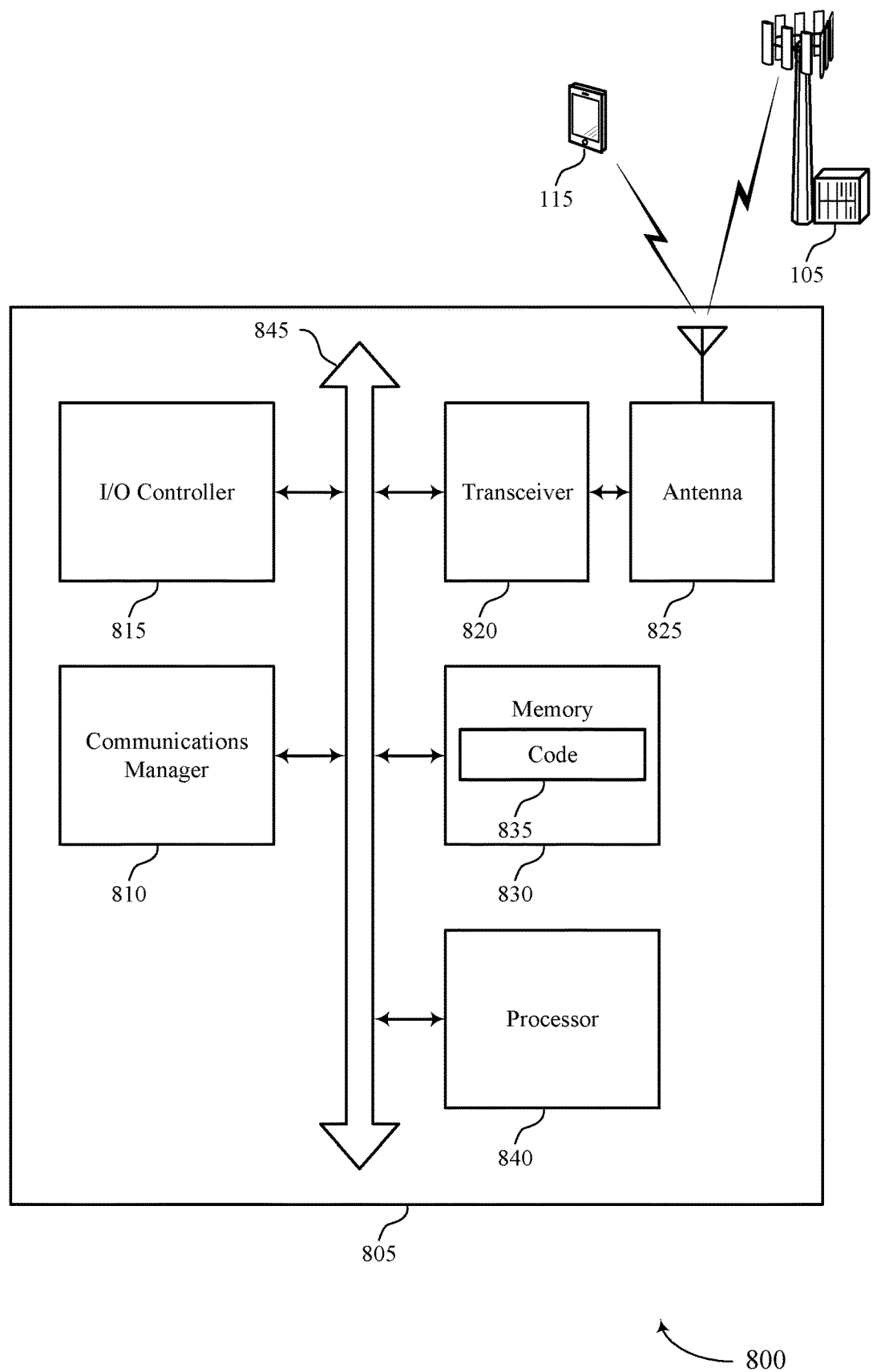
FIG. 8 shows a diagram of a system including a device that supports priority levels for CSI reporting in accordance with aspects of the present disclosure.

FIG. 8 shows a diagram of a system 800 including a device 805 that supports priority levels for CSI reporting in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine that a condition is met for a change in a priority level of CSI reporting associated with communications between the UE and a base station, change the priority level of the CSI reporting from a first priority level to a second priority level based on determining that the condition is met, and transmit, to the base station, a CSI report based on the CSI reporting having the second priority level.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting priority levels for CSI reporting).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
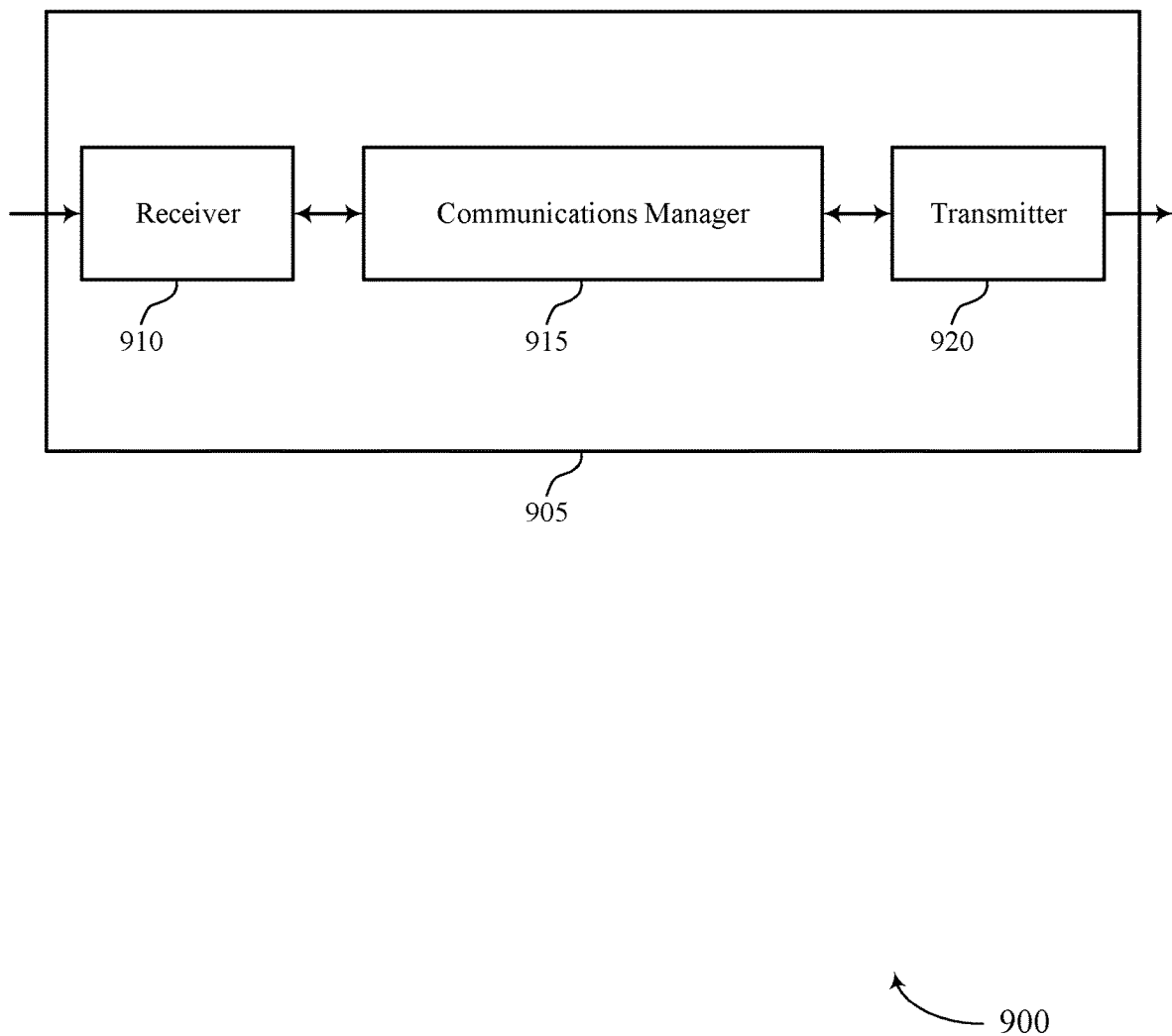
FIGS. 9 and 10 show block diagrams of devices that support priority levels for CSI reporting in accordance with aspects of the present disclosure.

FIG. 9 shows a block diagram 900 of a device 905 that supports priority levels for CSI reporting in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to priority levels for CSI reporting). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine that a condition is met for a change in a priority level of CSI reporting associated with communications between the base station and a UE, change the priority level of the CSI reporting from a first priority level to a second priority level based on determining that the condition is met, and receive, from the UE, a CSI report based on the CSI reporting having the second priority level. The communications manager 915 may be an example of aspects of the communications manager 1210 described herein.

The communications manager 915, or its sub-components, may be implemented in hardware, software (e.g., executed by a processor), or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
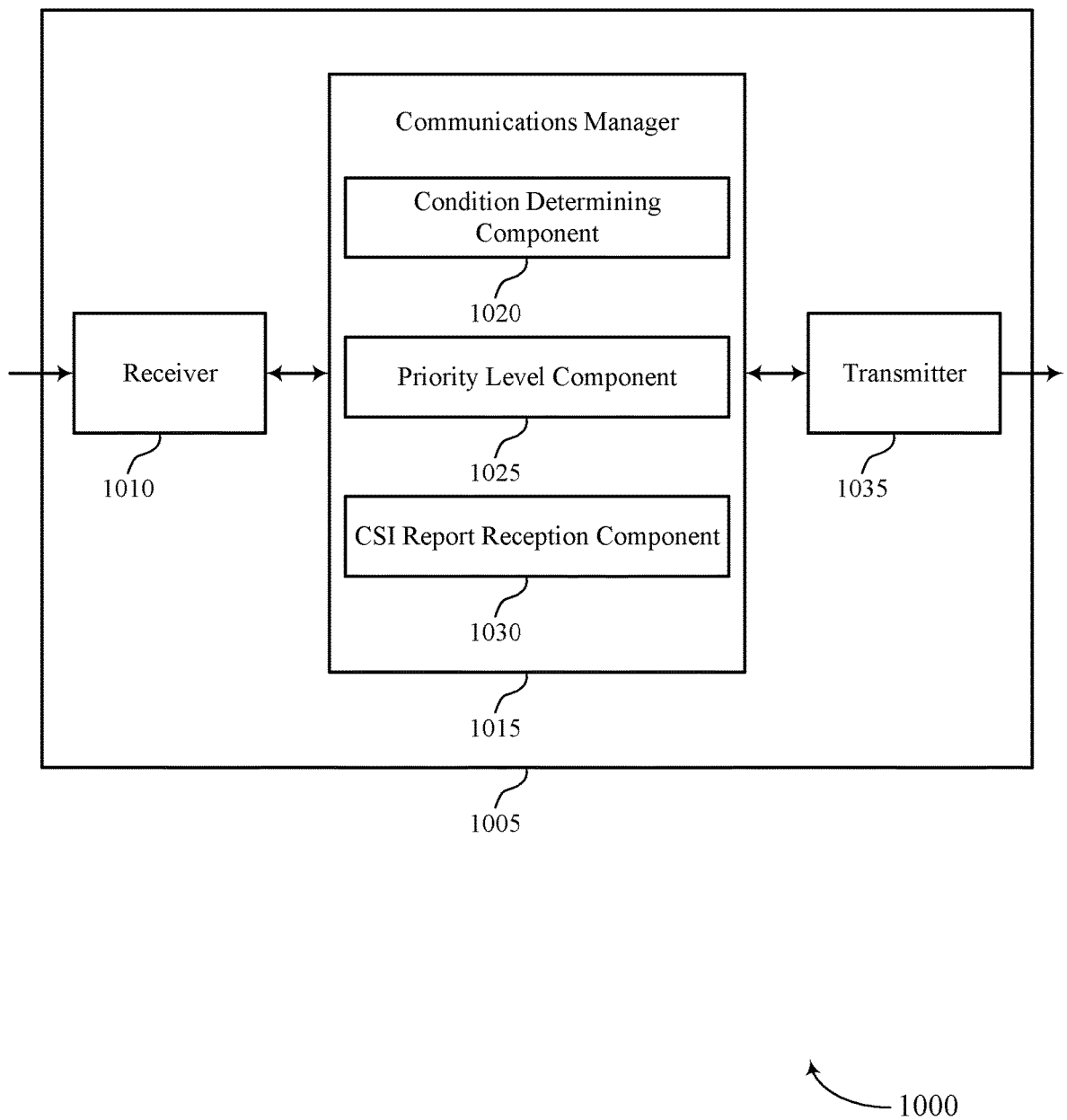

FIG. 10 shows a block diagram 1000 of a device 1005 that supports priority levels for CSI reporting in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to priority levels for CSI reporting). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a condition determining component 1020, a priority level component 1025, and a CSI report reception component 1030. The communications manager 1015 may be an example of aspects of the communications manager 1210 described herein.

The condition determining component 1020 may determine that a condition is met for a change in a priority level of CSI reporting associated with communications between the base station and a UE. The priority level component 1025 may change the priority level of the CSI reporting from a first priority level to a second priority level based on determining that the condition is met. The CSI report reception component 1030 may receive, from the UE, a CSI report based on the CSI reporting having the second priority level.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
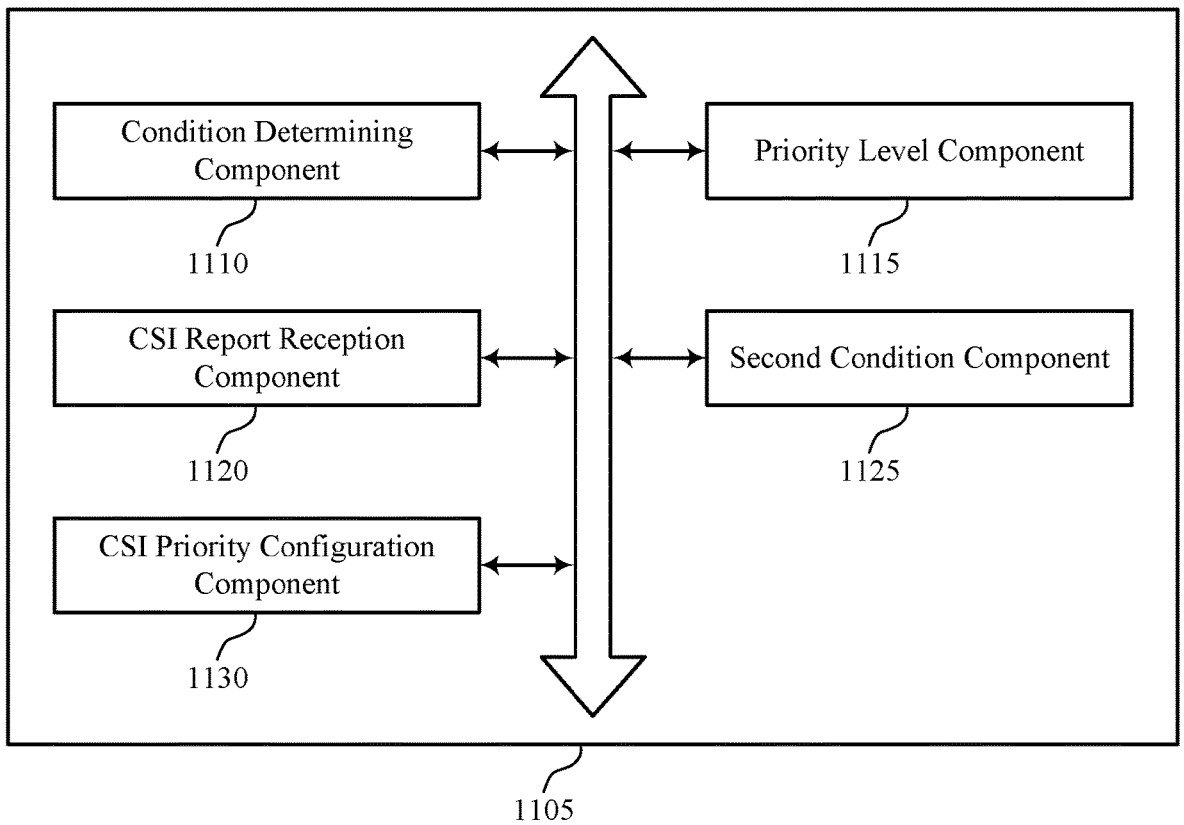
FIG. 11 shows a block diagram of a communications manager that supports priority levels for CSI reporting in accordance with aspects of the present disclosure.

FIG. 11 shows a block diagram 1100 of a communications manager 1105 that supports priority levels for CSI reporting in accordance with aspects of the present disclosure. The communications manager 1105 may be an example of aspects of a communications manager 915, a communications manager 1015, or a communications manager 1210 described herein. The communications manager 1105 may include a condition determining component 1110, a priority level component 1115, a CSI report reception component 1120, a second condition component 1125, and a CSI priority configuration component 1130. Each of these modules may communicate, directly or indirectly, with one another (e.g., via one or more buses).

The condition determining component 1110 may determine that a condition is met for a change in a priority level of CSI reporting associated with communications between the base station and a UE. In some cases, the CSI reporting is periodic or semi-persistent CSI reporting. In some examples, the condition determining component 1110 may identify that the UE is configured for a DRX mode that is associated with a WUS. In some examples, the condition determining component 1110 may determine that the CSI reporting is configured to be performed outside of an active time for the DRX mode, where changing the priority level is based on determining that the CSI reporting is configured to be performed outside of the active time.

In some examples, the condition determining component 1110 may identify that the UE is configured for a DRX mode that is associated with an active time. In some examples, the condition determining component 1110 may determine that the UE has operated in the DRX mode and outside of the active time for a duration that satisfies a threshold, where changing the priority level is based on the duration satisfying the threshold. In some cases, the threshold may include a threshold amount of time or a threshold number of DRX cycles, where each DRX cycle includes a respective potential active time.

In some examples, the condition determining component 1110 may receive a prior CSI report in accordance with the CSI reporting. In some examples, the condition determining component 1110 may determine that an amount of time since receiving the prior CSI report satisfies a threshold, where changing the priority level is based on determining that the amount of time since receiving the prior CSI report satisfies the threshold. In some cases, the threshold may include a threshold amount of time, or threshold number of DRX cycles, or a threshold number of missed reporting occasions for the CSI reporting.

The priority level component 1115 may change the priority level of the CSI reporting from a first priority level to a second priority level based on determining that the condition is met. In some examples, the priority level component 1115 may change the priority level of the CSI reporting from the second priority level to the first priority level based on determining that a second condition is met. In some cases, the second priority level is higher than the first priority level.

The CSI report reception component 1120 may receive, from the UE, a CSI report based on the CSI reporting having the second priority level.

The second condition component 1125 may determine that the second condition is met for a change in the priority level of the CSI reporting. In some examples, the second condition component 1125 may determine, based on receiving the CSI report, that a quantity of CSI reports received in accordance with the CSI reporting satisfies a threshold quantity. In some examples, the second condition component 1125 may determine, after changing the priority level of the CSI reporting from the first priority level to the second priority level, that a threshold amount of time has passed or that a threshold quantity of DRX cycles have occurred. In some examples, the second condition component 1125 may transmit, to the UE, a WUS indicating for the UE to transition to an active state associated with the DRX mode, where changing the priority level of the CSI reporting from the second priority level to the first priority level based on transmitting the WUS. In some examples, the second condition component 1125 may transmit, to the UE, signaling including an indication for the UE to change the priority level of the CSI reporting from the second priority level to the first priority level, where changing the priority level of the CSI reporting from the second priority level to the first priority level based on transmitting the signaling.

The CSI priority configuration component 1130 may transmit, to the UE, signaling including an indication of the condition to change the priority level of the CSI reporting from the first priority level to the second priority level. In some examples, the CSI priority configuration component 1130 may receive, from the UE, a capability report, where the indication of the condition is based on the capability report. In some cases, the signaling further includes an indication of a second condition to change the priority level of the CSI reporting from the second priority level to the first priority level.

Figure 12:
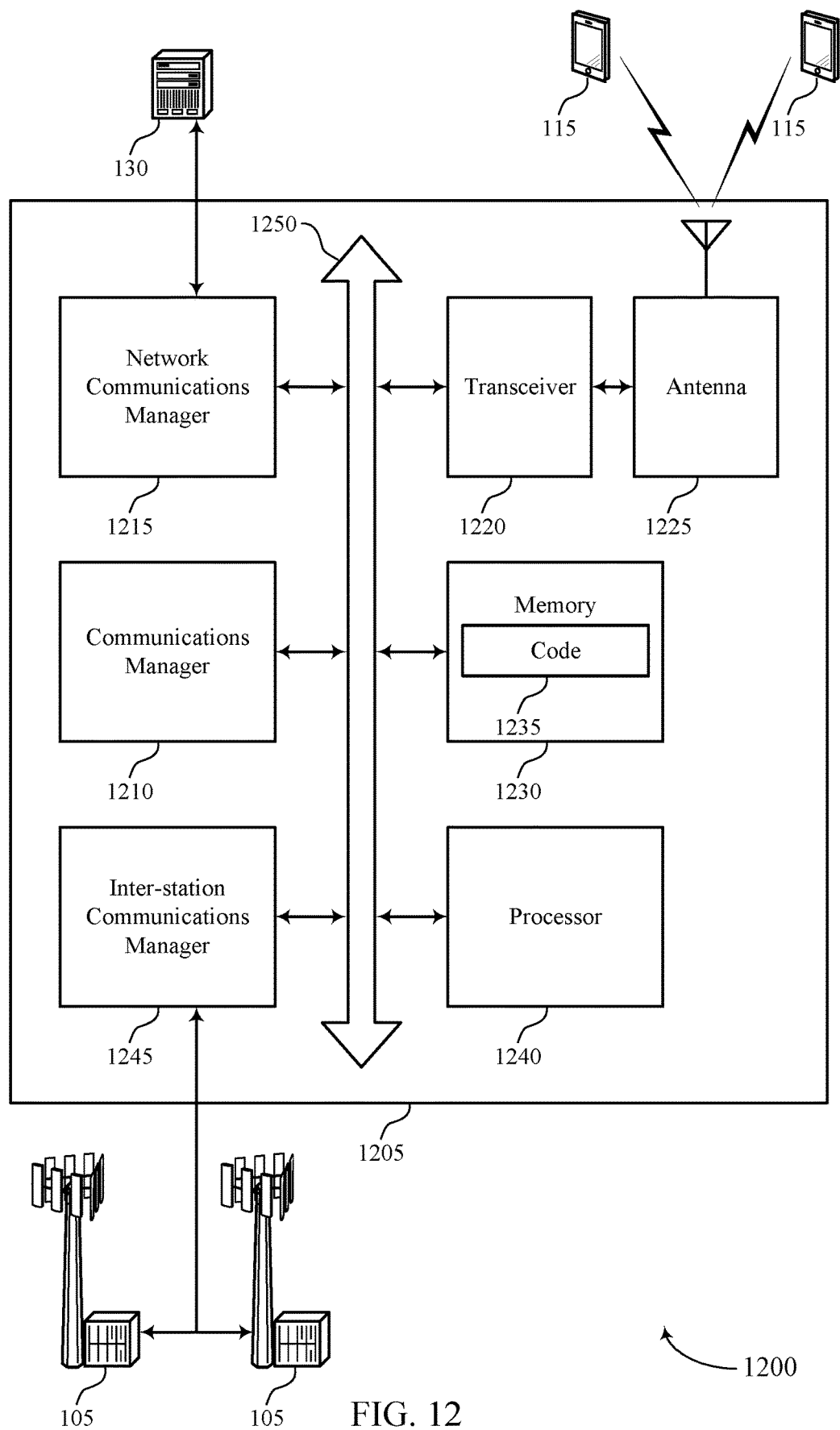
FIG. 12 shows a diagram of a system including a device that supports priority levels for CSI reporting in accordance with aspects of the present disclosure.

FIG. 12 shows a diagram of a system 1200 including a device 1205 that supports priority levels for CSI reporting in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine that a condition is met for a change in a priority level of CSI reporting associated with communications between the base station and a UE, change the priority level of the CSI reporting from a first priority level to a second priority level based on determining that the condition is met, and receive, from the UE, a CSI report based on the CSI reporting having the second priority level.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting priority levels for CSI reporting).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
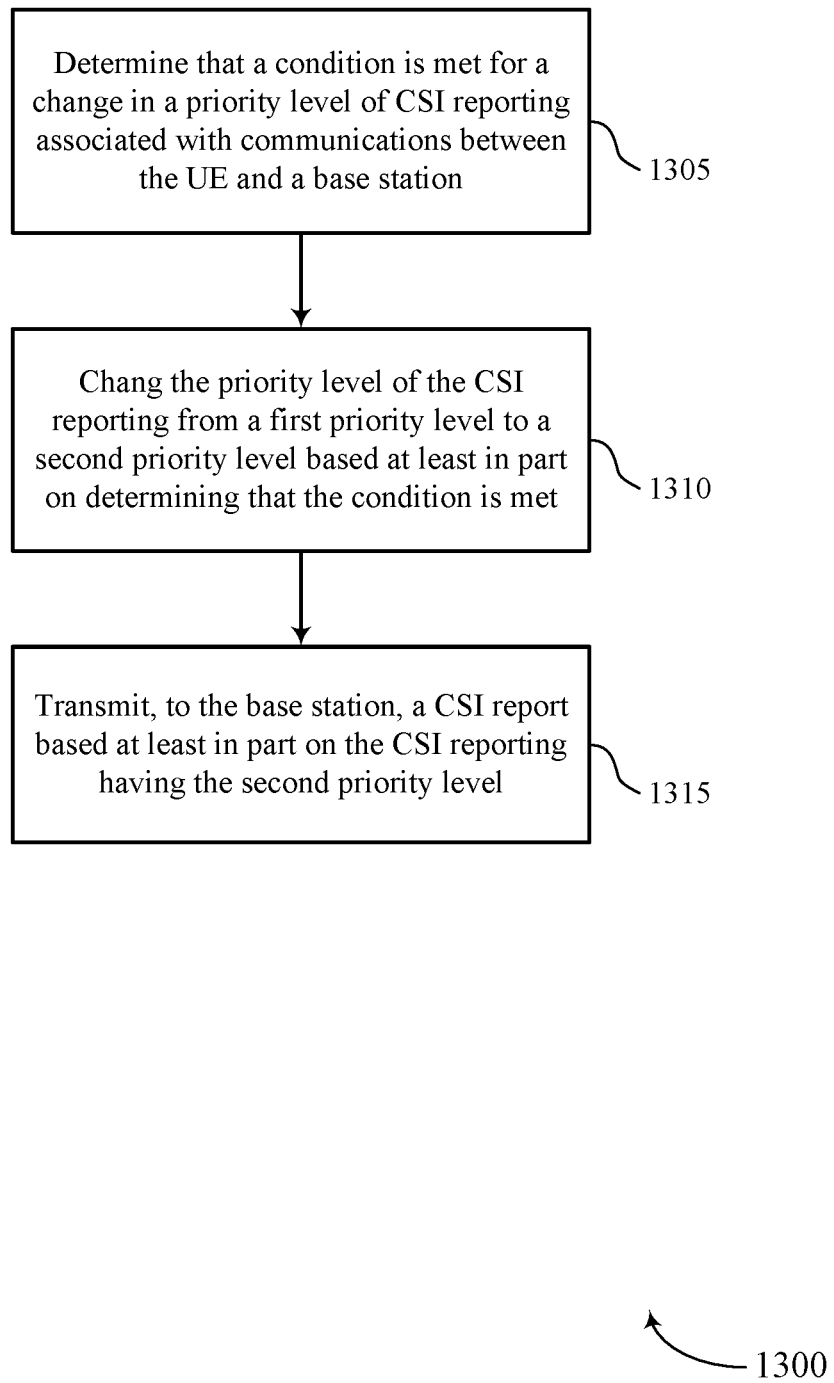
FIGS. 13 through 16 show flowcharts illustrating methods that support priority levels for CSI reporting in accordance with aspects of the present disclosure.

FIG. 13 shows a flowchart illustrating a method 1300 that supports priority levels for CSI reporting in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine that a condition is met for a change in a priority level of CSI reporting associated with communications between the UE and a base station. The operations of 1305 may be performed according to the methods described herein. In some examples, aspects of the operations of 1305 may be performed by a condition determination component as described with reference to FIGS. 5 through 8.

At 1310, the UE may change the priority level of the CSI reporting from a first priority level to a second priority level based at least in part on determining that the condition is met. The operations of 1310 may be performed according to the methods described herein. In some examples, aspects of the operations of 1310 may be performed by a priority level changing component as described with reference to FIGS. 5 through 8.

At 1315, the UE may transmit, to the base station, a CSI report based at least in part on the CSI reporting having the second priority level. The operations of 1315 may be performed according to the methods described herein. In some examples, aspects of the operations of 1315 may be performed by a CSI report transmission component as described with reference to FIGS. 5 through 8.

Figure 14:
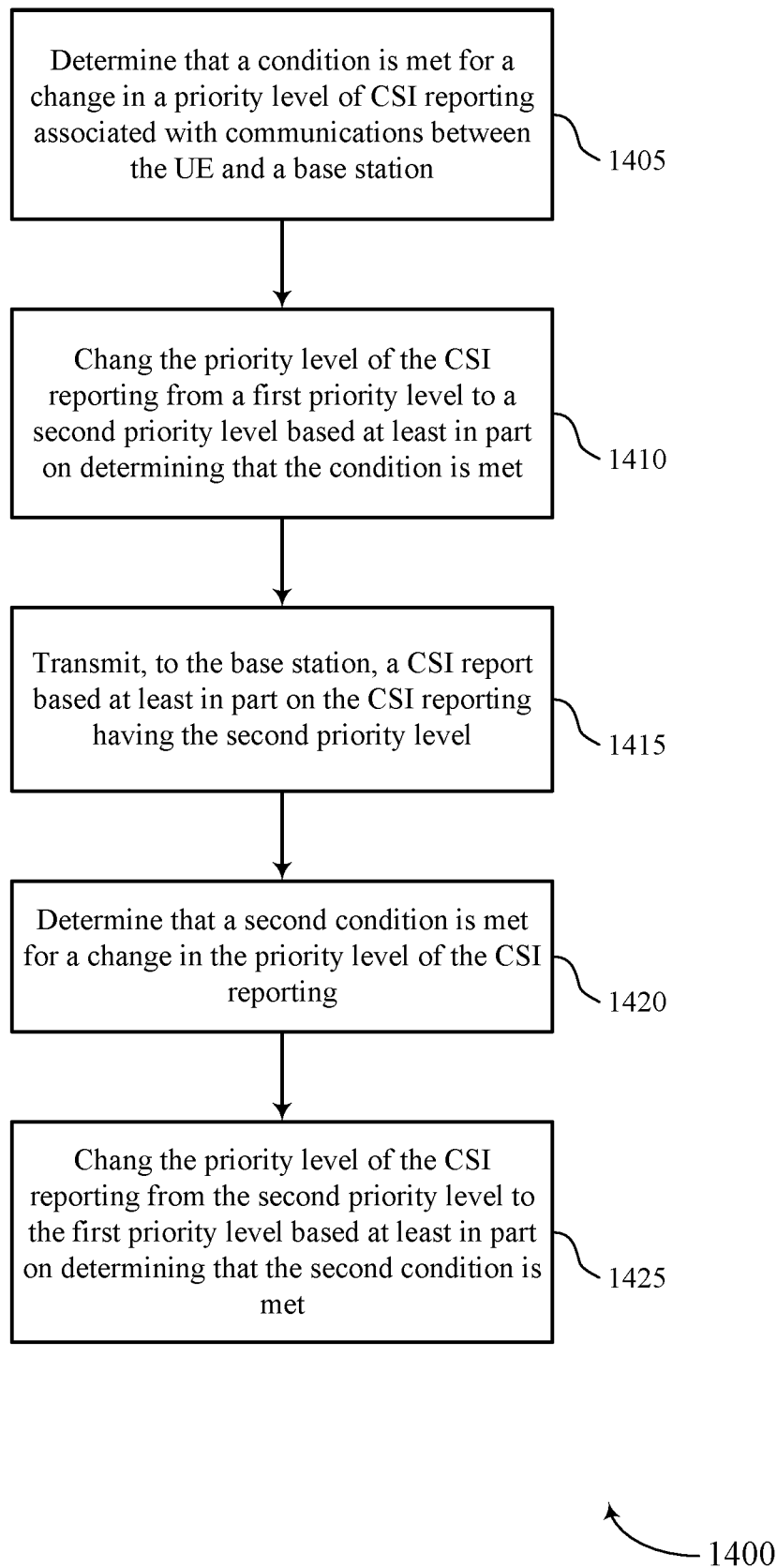

FIG. 14 shows a flowchart illustrating a method 1400 that supports priority levels for CSI reporting in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may determine that a condition is met for a change in a priority level of CSI reporting associated with communications between the UE and a base station. The operations of 1405 may be performed according to the methods described herein. In some examples, aspects of the operations of 1405 may be performed by a condition determination component as described with reference to FIGS. 5 through 8.

At 1410, the UE may change the priority level of the CSI reporting from a first priority level to a second priority level based at least in part on determining that the condition is met. The operations of 1410 may be performed according to the methods described herein. In some examples, aspects of the operations of 1410 may be performed by a priority level changing component as described with reference to FIGS. 5 through 8.

At 1415, the UE may transmit, to the base station, a CSI report based at least in part on the CSI reporting having the second priority level. The operations of 1415 may be performed according to the methods described herein. In some examples, aspects of the operations of 1415 may be performed by a CSI report transmission component as described with reference to FIGS. 5 through 8.

At 1420, the UE may determine that a second condition is met for a change in the priority level of the CSI reporting. The operations of 1420 may be performed according to the methods described herein. In some examples, aspects of the operations of 1420 may be performed by a second condition determination component as described with reference to FIGS. 5 through 8.

At 1425, the UE may change the priority level of the CSI reporting from the second priority level to the first priority level based at least in part on determining that the second condition is met. The operations of 1425 may be performed according to the methods described herein. In some examples, aspects of the operations of 1425 may be performed by a priority level changing component as described with reference to FIGS. 5 through 8.

Figure 15:
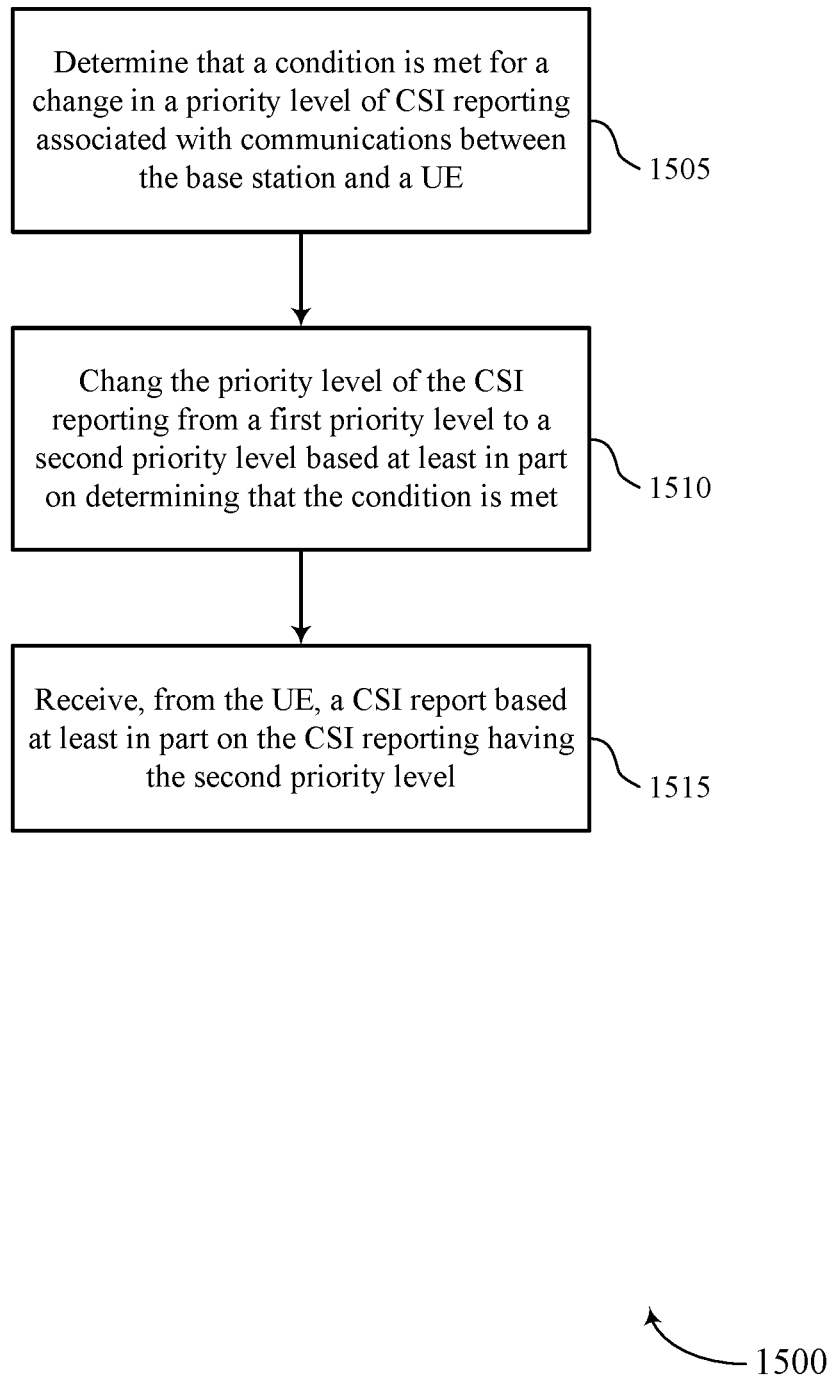

FIG. 15 shows a flowchart illustrating a method 1500 that supports priority levels for CSI reporting in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may determine that a condition is met for a change in a priority level of CSI reporting associated with communications between the base station and a UE. The operations of 1505 may be performed according to the methods described herein. In some examples, aspects of the operations of 1505 may be performed by a condition determining component as described with reference to FIGS. 9 through 12.

At 1510, the base station may change the priority level of the CSI reporting from a first priority level to a second priority level based at least in part on determining that the condition is met. The operations of 1510 may be performed according to the methods described herein. In some examples, aspects of the operations of 1510 may be performed by a priority level component as described with reference to FIGS. 9 through 12.

At 1515, the base station may receive, from the UE, a CSI report based at least in part on the CSI reporting having the second priority level. The operations of 1515 may be performed according to the methods described herein. In some examples, aspects of the operations of 1515 may be performed by a CSI report reception component as described with reference to FIGS. 9 through 12.

Figure 16:
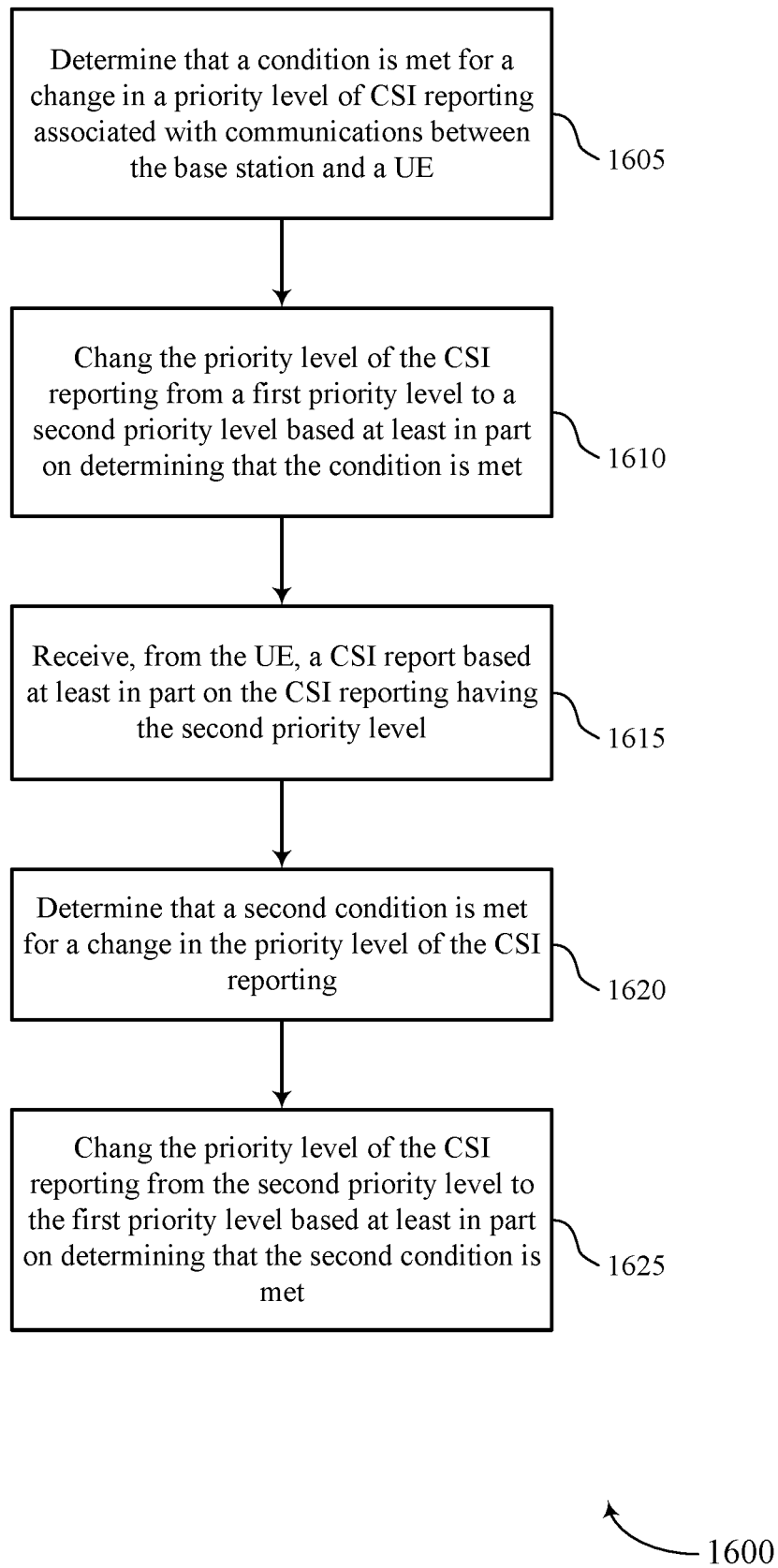

FIG. 16 shows a flowchart illustrating a method 1600 that supports priority levels for CSI reporting in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may determine that a condition is met for a change in a priority level of CSI reporting associated with communications between the base station and a UE. The operations of 1605 may be performed according to the methods described herein. In some examples, aspects of the operations of 1605 may be performed by a condition determining component as described with reference to FIGS. 9 through 12.

At 1610, the base station may change the priority level of the CSI reporting from a first priority level to a second priority level based at least in part on determining that the condition is met. The operations of 1610 may be performed according to the methods described herein. In some examples, aspects of the operations of 1610 may be performed by a priority level component as described with reference to FIGS. 9 through 12.

At 1615, the base station may receive, from the UE, a CSI report based at least in part on the CSI reporting having the second priority level. The operations of 1615 may be performed according to the methods described herein. In some examples, aspects of the operations of 1615 may be performed by a CSI report reception component as described with reference to FIGS. 9 through 12.

At 1620, the base station may determine that a second condition is met for a change in the priority level of the CSI reporting. The operations of 1620 may be performed according to the methods described herein. In some examples, aspects of the operations of 1620 may be performed by a second condition component as described with reference to FIGS. 9 through 12.

At 1625, the base station may change the priority level of the CSI reporting from the second priority level to the first priority level based at least in part on determining that the second condition is met. The operations of 1625 may be performed according to the methods described herein. In some examples, aspects of the operations of 1625 may be performed by a second condition component as described with reference to FIGS. 9 through 12.

The following provides an overview of aspects of the present disclosure:

Aspect 1: A method for wireless communication at a UE, comprising: determining that a condition is met for a change in a priority level of CSI reporting associated with communications between the UE and a base station; changing the priority level of the CSI reporting from a first priority level to a second priority level based at least in part on determining that the condition is met; and transmitting, to the base station, a CSI report based at least in part on the CSI reporting having the second priority level.

Aspect 2: The method of aspect 1, wherein the second priority level is higher than the first priority level.

Aspect 3: The method of any of aspects 1 through 2, wherein determining that the condition is met comprises: identifying that the UE is configured for a DRX mode that is associated with a WUS; and determining that the CSI reporting is configured to be performed outside of an active time for the DRX mode, wherein changing the priority level is based at least in part on determining that the CSI reporting is configured to be performed outside of the active time.

Aspect 4: The method of any of aspects 1 through 2, wherein determining that the condition is met comprises: identifying that the UE is configured for a DRX mode that is associated with an active time; and determining that the UE has operated in the DRX mode and outside of the active time for a duration that satisfies a threshold, wherein changing the priority level is based at least in part on the duration satisfying the threshold.

Aspect 5: The method of aspect 4, wherein the threshold comprises: a threshold amount of time; or a threshold number of DRX cycles, wherein each DRX cycle comprises a respective potential active time.

Aspect 6: The method of any of aspects 1 through 2, wherein determining that the condition is met comprises: transmitting a prior CSI report in accordance with the CSI reporting; and determining that an amount of time since transmitting the prior CSI report satisfies a threshold, wherein changing the priority level is based at least in part on determining that the amount of time since transmitting the prior CSI report satisfies the threshold.

Aspect 7: The method of aspect 6, wherein the threshold comprises: a threshold amount of time; or a threshold number of DRX cycles; or a threshold number of missed reporting occasions for the CSI reporting.

Aspect 8: The method of any of aspects 1 through 7, further comprising: determining that a second condition is met for a change in the priority level of the CSI reporting; and changing the priority level of the CSI reporting from the second priority level to the first priority level based at least in part on determining that the second condition is met.

Aspect 9: The method of aspect 8, wherein determining that the second condition is met comprises: determining, based at least in part on transmitting the CSI report, that a quantity of CSI reports transmitted in accordance with the CSI reporting satisfies a threshold quantity.

Aspect 10: The method of aspect 8, wherein determining that the second condition is met comprises: determining, after changing the priority level of the CSI reporting from the first priority level to the second priority level, that a threshold amount of time has passed or that a threshold quantity of DRX cycles have occurred.

Aspect 11: The method of aspect 8, wherein determining that the second condition is met comprises: receiving, from the base station, a WUS indicating for the UE to transition to an active state associated with a DRX mode.

Aspect 12: The method of aspect 8, wherein determining that the second condition is met comprises: receiving, from the base station, signaling comprising an indication for the UE to change the priority level of the CSI reporting from the second priority level to the first priority level.

Aspect 13: The method of any of aspects 1 through 12, further comprising: receiving, from the base station, signaling comprising an indication of the condition for the UE to change the priority level of the CSI reporting from the first priority level to the second priority level.

Aspect 14: The method of aspect 13, further comprising: transmitting, to the base station, a capability report, wherein the indication of the condition is based at least in part on the capability report.

Aspect 15: The method of any of aspects 13 through 14, wherein the signaling further comprises an indication of a second condition for the UE to change the priority level of the CSI reporting from the second priority level to the first priority level.

Aspect 16: The method of any of aspects 1 through 15, wherein the CSI reporting is periodic or semi-persistent CSI reporting.

Aspect 17: A method for wireless communication at a base station, comprising: determining that a condition is met for a change in a priority level of CSI reporting associated with communications between the base station and a UE; changing the priority level of the CSI reporting from a first priority level to a second priority level based at least in part on determining that the condition is met; and receiving, from the UE, a CSI report based at least in part on the CSI reporting having the second priority level.

Aspect 18: The method of aspect 17, wherein the second priority level is higher than the first priority level.

Aspect 19: The method of any of aspects 17 through 18, wherein determining that the condition is met comprises: identifying that the UE is configured for a DRX mode that is associated with a WUS; and determining that the CSI reporting is configured to be performed outside of an active time for the DRX mode, wherein changing the priority level is based at least in part on determining that the CSI reporting is configured to be performed outside of the active time.

Aspect 20: The method of any of aspects 17 through 18, wherein determining that the condition is met comprises: identifying that the UE is configured for a DRX mode that is associated with an active time; and determining that the UE has operated in the DRX mode and outside of the active time for a duration that satisfies a threshold, wherein changing the priority level is based at least in part on the duration satisfying the threshold.

Aspect 21: The method of aspect 20, wherein the threshold comprises: a threshold amount of time; or a threshold number of DRX cycles, wherein each DRX cycle comprises a respective potential active time.

Aspect 22: The method of any of aspects 17 through 18, wherein determining that the condition is met comprises: receiving a prior CSI report in accordance with the CSI reporting; and determining that an amount of time since receiving the prior CSI report satisfies a threshold, wherein changing the priority level is based at least in part on determining that the amount of time since receiving the prior CSI report satisfies the threshold.

Aspect 23: The method of aspect 22, wherein the threshold comprises: a threshold amount of time; or a threshold number of DRX cycles; or a threshold number of missed reporting occasions for the CSI reporting.

Aspect 24: The method of any of aspects 17 through 23, further comprising: determining that a second condition is met for a change in the priority level of the CSI reporting; and changing the priority level of the CSI reporting from the second priority level to the first priority level based at least in part on determining that the second condition is met.

Aspect 25: The method of aspect 24, wherein determining that the second condition is met comprises: determining, based at least in part on receiving the CSI report, that a quantity of CSI reports received in accordance with the CSI reporting satisfies a threshold quantity.

Aspect 26: The method of aspect 24, wherein determining that the second condition is met comprises: determining, after changing the priority level of the CSI reporting from the first priority level to the second priority level, that a threshold amount of time has passed or that a threshold quantity of DRX cycles have occurred.

Aspect 27: The method of aspect 24, wherein determining that the second condition is met comprises: transmitting, to the UE, a WUS indicating for the UE to transition to an active state associated with a DRX mode, wherein changing the priority level of the CSI reporting from the second priority level to the first priority level based at least in part on transmitting the WUS.

Aspect 28: The method of aspect 24, wherein determining that the second condition is met comprises: transmitting, to the UE, signaling comprising an indication for the UE to change the priority level of the CSI reporting from the second priority level to the first priority level, wherein changing the priority level of the CSI reporting from the second priority level to the first priority level based at least in part on transmitting the signaling.

Aspect 29: The method of any of aspects 17 through 28, further comprising: transmitting, to the UE, signaling comprising an indication of the condition to change the priority level of the CSI reporting from the first priority level to the second priority level.

Aspect 30: An apparatus for wireless communication at a UE, comprising at least one processor; memory coupled with the at least one processor; and instructions stored in the memory and executable by the at least one processor to cause the apparatus to perform a method of any of aspects 1 through 16.

Aspect 31: An apparatus for wireless communication at a UE, comprising at least one means for performing a method of any of aspects 1 through 16.

Aspect 32: A non-transitory computer-readable medium storing code for wireless communication at a UE, the code comprising instructions executable by a processor to perform a method of any of aspects 1 through 16.

Aspect 33: An apparatus for wireless communication at a base station, comprising at least one processor; memory coupled with the at least one processor; and instructions stored in the memory and executable by the at least one processor to cause the apparatus to perform a method of any of aspects 17 through 29.

Aspect 34: An apparatus for wireless communication at a base station, comprising at least one means for performing a method of any of aspects 17 through 29.

Aspect 35: A non-transitory computer-readable medium storing code for wireless communication at a base station, the code comprising instructions executable by a processor to perform a method of any of aspects 17 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining that a condition is met for a change in a priority level of channel state information reporting associated with communications between the UE and a network entity, wherein the condition is based at least in part on an amount of time since transmitting a prior channel state information report satisfying a threshold;
   changing the priority level of the channel state information reporting from a first priority level to a second priority level based at least in part on determining that the condition is met; and
   transmitting, to the network entity, a channel state information report based at least in part on the channel state information reporting having the second priority level.

2. The method of claim 1, wherein the second priority level is higher than the first priority level.

3. The method of claim 1, wherein determining that the condition is met comprises:
   identifying that the UE is configured for a discontinuous reception mode, the discontinuous reception mode associated with a wake-up signal; and
   determining that the channel state information reporting is configured to be performed outside of an active time for the discontinuous reception mode, wherein changing the priority level is based at least in part on determining that the channel state information reporting is configured to be performed outside of the active time.

4. The method of claim 1, wherein determining that the condition is met comprises:
   identifying that the UE is configured for a discontinuous reception mode, the discontinuous reception mode associated with an active time; and
   determining that the UE has operated in the discontinuous reception mode and outside of the active time for a duration that satisfies a second threshold, wherein changing the priority level is based at least in part on the duration satisfying the second threshold.

5. The method of claim 4, wherein the threshold comprises:
   a threshold amount of time; or
   a threshold number of discontinuous reception cycles, wherein each discontinuous reception cycle comprises a respective potential active time.

6. The method of claim 1, wherein determining that the condition is met comprises:
   transmitting a prior channel state information report in accordance with the channel state information reporting; and
   determining that the amount of time since transmitting the prior channel state information report satisfies the threshold, wherein changing the priority level is based at least in part on determining that the amount of time since transmitting the prior channel state information report satisfies the threshold.

7. The method of claim 6, wherein the threshold comprises:
   a threshold amount of time; or
   a threshold number of discontinuous reception cycles; or
   a threshold number of missed reporting occasions for the channel state information reporting.

8. The method of claim 1, further comprising:
   determining that a second condition is met for a change in the priority level of the channel state information reporting; and
   changing the priority level of the channel state information reporting from the second priority level to the first priority level based at least in part on determining that the second condition is met.

9. The method of claim 8, wherein determining that the second condition is met comprises:
   determining, based at least in part on transmitting the channel state information report, that a quantity of channel state information reports transmitted in accordance with the channel state information reporting satisfies a threshold quantity.

10. The method of claim 8, wherein determining that the second condition is met comprises:
    determining, after changing the priority level of the channel state information reporting from the first priority level to the second priority level, that a threshold amount of time has passed or that a threshold quantity of discontinuous reception cycles have occurred.

11. The method of claim 8, wherein determining that the second condition is met comprises:
    receiving, from the network entity, a wake-up signal indicating for the UE to transition to an active state associated with a discontinuous reception mode.

12. The method of claim 8, wherein determining that the second condition is met comprises:
    receiving, from the network entity, signaling comprising an indication for the UE to change the priority level of the channel state information reporting from the second priority level to the first priority level.

13. The method of claim 1, further comprising:
    receiving, from the network entity, signaling comprising an indication of the condition for the UE to change the priority level of the channel state information reporting from the first priority level to the second priority level.

14. The method of claim 13, further comprising:
    transmitting, to the network entity, a capability report, wherein the indication of the condition is based at least in part on the capability report.

15. The method of claim 13, wherein the signaling further comprises an indication of a second condition for the UE to change the priority level of the channel state information reporting from the second priority level to the first priority level.

16. A method for wireless communication at a network entity, comprising:
    determining that a condition is met for a change in a priority level of channel state information reporting associated with communications between the network entity and a user equipment (UE), wherein the condition is based at least in part on an amount of time since transmitting a prior channel state information report satisfying a threshold;

changing the priority level of the channel state information reporting from a first priority level to a second priority level based at least in part on determining that the condition is met; and receiving, from the UE, a channel state information report based at least in part on the channel state information reporting having the second priority level.

17. The method of claim 16, wherein determining that the condition is met comprises:
identifying that the UE is configured for a discontinuous reception mode, the discontinuous reception mode associated with a wake-up signal; and
determining that the channel state information reporting is configured to be performed outside of an active time for the discontinuous reception mode, wherein changing the priority level is based at least in part on determining that the channel state information reporting is configured to be performed outside of the active time.

18. The method of claim 16, wherein determining that the condition is met comprises:
identifying that the UE is configured for a discontinuous reception mode, the discontinuous reception mode associated with an active time; and
determining that the UE has operated in the discontinuous reception mode and outside of the active time for a duration that satisfies a second threshold, wherein changing the priority level is based at least in part on the duration satisfying the second threshold.

19. The method of claim 16, wherein determining that the condition is met comprises:
receiving a prior channel state information report in accordance with the channel state information reporting; and
determining that the amount of time since receiving the prior channel state information report satisfies a threshold, wherein changing the priority level is based at least in part on determining that the amount of time since receiving the prior channel state information report satisfies the threshold.

20. The method of claim 16, further comprising:
determining that a second condition is met for a change in the priority level of the channel state information reporting; and
changing the priority level of the channel state information reporting from the second priority level to the first priority level based at least in part on determining that the second condition is met.

21. The method of claim 20, wherein determining that the second condition is met comprises:
determining, based at least in part on receiving the channel state information report, that a quantity of channel state information reports received in accordance with the channel state information reporting satisfies a threshold quantity.

22. The method of claim 20, wherein determining that the second condition is met comprises:
determining, after changing the priority level of the channel state information reporting from the first priority level to the second priority level, that a threshold amount of time has passed or that a threshold quantity of discontinuous reception cycles have occurred.

23. The method of claim 20, wherein determining that the second condition is met comprises:
transmitting, to the UE, a wake-up signal indicating for the UE to transition to an active state associated with a discontinuous reception mode, wherein changing the priority level of the channel state information reporting from the second priority level to the first priority level based at least in part on transmitting the wake-up signal.

24. The method of claim 20, wherein determining that the second condition is met comprises:
transmitting, to the UE, signaling comprising an indication for the UE to change the priority level of the channel state information reporting from the second priority level to the first priority level, wherein changing the priority level of the channel state information reporting from the second priority level to the first priority level based at least in part on transmitting the signaling.

25. The method of claim 16, further comprising:
transmitting, to the UE, signaling comprising an indication of the condition to change the priority level of the channel state information reporting from the first priority level to the second priority level.

26. An apparatus for wireless communication at a user equipment (UE), comprising:
at least one processor; and
memory coupled to the at least one processor, the memory storing instructions for the at least one processor to cause the apparatus to:
determine that a condition is met for a change in a priority level of channel state information reporting associated with communications between the UE and a network entity, wherein the condition is based at least in part on an amount of time since transmitting a prior channel state information report satisfying a threshold;
change the priority level of the channel state information reporting from a first priority level to a second priority level based at least in part on determining that the condition is met; and
transmit, to the network entity, a channel state information report based at least in part on the channel state information reporting having the second priority level.

27. The apparatus of claim 26, wherein the instructions are further executable by the at least one processor to cause the apparatus to:
identify that the UE is configured for a discontinuous reception mode, the discontinuous reception mode associated with a wake-up signal; and
determine that the channel state information reporting is configured to be performed outside of an active time for the discontinuous reception mode, wherein changing the priority level is based at least in part on determining that the channel state information reporting is configured to be performed outside of the active time.

28. The apparatus of claim 26, wherein the instructions are further executable by the at least one processor to cause the apparatus to:
identify that the UE is configured for a discontinuous reception mode, the discontinuous reception mode associated with an active time; and
determine that the UE has operated in the discontinuous reception mode and outside of the active time for a duration that satisfies a second threshold, wherein changing the priority level is based at least in part on the duration satisfying the second threshold.

29. The apparatus of claim 26, wherein the instructions are further executable by the at least one processor to cause the apparatus to:
transmit a prior channel state information report in accordance with the channel state information reporting; and determine that the amount of time since transmitting the prior channel state information report satisfies the threshold, wherein changing the priority level is based at least in part on determining that the amount of time since transmitting the prior channel state information report satisfies the threshold.

30. An apparatus for wireless communication at a network entity, comprising:
    at least one processor; and
    memory coupled to the at least one processor, the memory storing instructions for the at least one processor to cause the apparatus to:
        determine that a condition is met for a change in a priority level of channel state information reporting associated with communications between the network entity and a user equipment (UE), wherein the condition is based at least in part on an amount of time since transmitting a prior channel state information report satisfying a threshold;
        change the priority level of the channel state information reporting from a first priority level to a second priority level based at least in part on determining that the condition is met; and
        receive, from the UE, a channel state information report based at least in part on the channel state information reporting having the second priority level.

* * * * *